US012561734B2

(12) United States Patent
Wade et al.

(10) Patent No.: US 12,561,734 B2
(45) **Date of Patent: \*Feb. 24, 2026**

(54) SYSTEMS, METHODS, AND NON-TRANSITORY COMPUTER-READABLE MEDIUM FOR RECOMMENDING 2D IMAGE

(71) Applicant: SHOPIFY INC., Ottawa (CA)

(72) Inventors: Jonathan Wade, Ottawa (CA); Juho Mikko Haapoja, Toronto (CA)

(73) Assignee: SHOPIFY INC., Ottawa (CA)

( \* ) Notice: Subject to any disclaimer, the term of this patent is extended or adjusted under 35 U.S.C. 154(b) by 3 days.

This patent is subject to a terminal disclaimer.

(21) Appl. No.: 18/209,919

(22) Filed: Jun. 14, 2023

(65) Prior Publication Data

US 2023/0325909 A1     Oct. 12, 2023

Related U.S. Application Data

(63) Continuation of application No. 16/714,301, filed on Dec. 13, 2019, now Pat. No. 11,727,475.

(51) Int. Cl.
| | |
|---|---|
| *G06Q 30/00* | (2023.01) |
| *G06Q 30/0601* | (2023.01) |
| *G06T 15/20* | (2011.01) |

(52) U.S. Cl.
CPC ..... *G06Q 30/0643* (2013.01); *G06Q 30/0631* (2013.01); *G06T 15/205* (2013.01)

(58) Field of Classification Search
CPC ........... G06Q 30/0643; G06Q 30/0631; G06Q 30/0641; G06Q 30/06431;

(Continued)

(56) References Cited

U.S. PATENT DOCUMENTS

| | | | |
|---|---|---|---|
| 8,606,645 B1 | 12/2013 | Applefeld | |
| 9,110,975 B1 * | 8/2015 | Diligenti | ............. G06F 16/3325 |

(Continued)

FOREIGN PATENT DOCUMENTS

| | | |
|---|---|---|
| CN | 108885800 A | 11/2018 |
| CN | 110310175 A | 10/2019 |
| JP | 2019061525 A | 4/2019 |

OTHER PUBLICATIONS

Boardman, R. (2016). Investigating how a fashion retailer's website design affects users' responses across a fifty year age span through the use of eye tracking technology (Order No. 10174497). Available from ProQuest Dissertations & Theses Global. (1827523187). (Year: 2016).*

(Continued)

*Primary Examiner* — Arielle E Weiner

(74) *Attorney, Agent, or Firm* — Smart & Biggar LP

(57) ABSTRACT

Methods and systems for generating 2D images based on a 3D model are disclosed. 3D three-dimensional (3D) model data associated with a product offering in an online store are sent to a first electronic device, the 3D model data being generated from a stored 3D model. Data representing a selected value for a viewing parameter of the stored 3D model are received from the first electronic device. From the received data, a desired 2D view is determined for a stored 3D model. A recommendation is generated, for a second electronic device, to include the desired 2D view in a stored listing associated with the product offering.

17 Claims, 14 Drawing Sheets

(58) Field of Classification Search

CPC ....... G06Q 30/06432; G06Q 30/06433; G06Q 30/06434; G06Q 30/06435; G06Q 30/0644; G06Q 30/06442; G06Q 30/06443; G06Q 30/06444; G06Q 30/06311; G06Q 30/06312; G06Q 30/06313; G06Q 30/06314; G06Q 30/06315; G06T 15/205

USPC ....................................................... 705/27.2

See application file for complete search history.

(56) References Cited

U.S. PATENT DOCUMENTS

| | | | |
|---|---|---|---|
| 9,591,050 | B1 | 3/2017 | Sherrets et al. |
| 10,026,229 | B1 | 7/2018 | Yalniz et al. |
| 10,157,351 | B1* | 12/2018 | Rastogi ................. G06F 16/957 |
| 10,319,150 | B1 | 6/2019 | Canada et al. |
| 10,902,628 | B1* | 1/2021 | Kharboutly ............... G06T 7/20 |
| 2015/0149317 | A1 | 5/2015 | Marschke et al. |
| 2016/0094866 | A1* | 3/2016 | Frazzini ............. H04N 21/8126 |
| | | | 725/10 |
| 2016/0275165 | A1* | 9/2016 | Kilroy ................... G06F 16/254 |
| 2017/0132841 | A1* | 5/2017 | Morrison ............... G06V 20/20 |
| 2018/0261001 | A1* | 9/2018 | Wang ...................... G06T 17/20 |
| 2018/0293240 | A1 | 10/2018 | Golland et al. |
| 2019/0340649 | A1 | 11/2019 | Ayush et al. |
| 2020/0104882 | A1* | 4/2020 | Allison .............. G06Q 30/0269 |
| 2020/0202419 | A1 | 6/2020 | Beauchamp |

OTHER PUBLICATIONS

European Patent Office, "Communication pursuant to Article 94(3) EPC" for EP Patent Appl. No. 20188513.4 dated Nov. 22, 2023.

Boardman, R., "Investigating how a fashion retailer's website design affects users' responses across a fifty year age span through the use of eye tracking technology" (Order No. 10174497) Available from ProQuest Dissertations & Theses Global. Retrieved from https://proquest.com/dissertations-theses/investigating-how-fashion-retailers-website/docview/1827523187/se-2 2016.

European Patent Office, "Extended European Search Report" for EP Patent Application No. 20188513.4-1213. Jan. 26, 2021.

Intellectual Property India, "Office Action" for IN Patent Application No. 202024038181 Nov. 26, 2021.

Japan Patent Office, Office Action for corresponding Japanse Patent Application No. 2020-170285 dated Jul. 10, 2024.

* cited by examiner

710

715

1010

1020

Chair

1030

Zoom Level: 0.9

1100

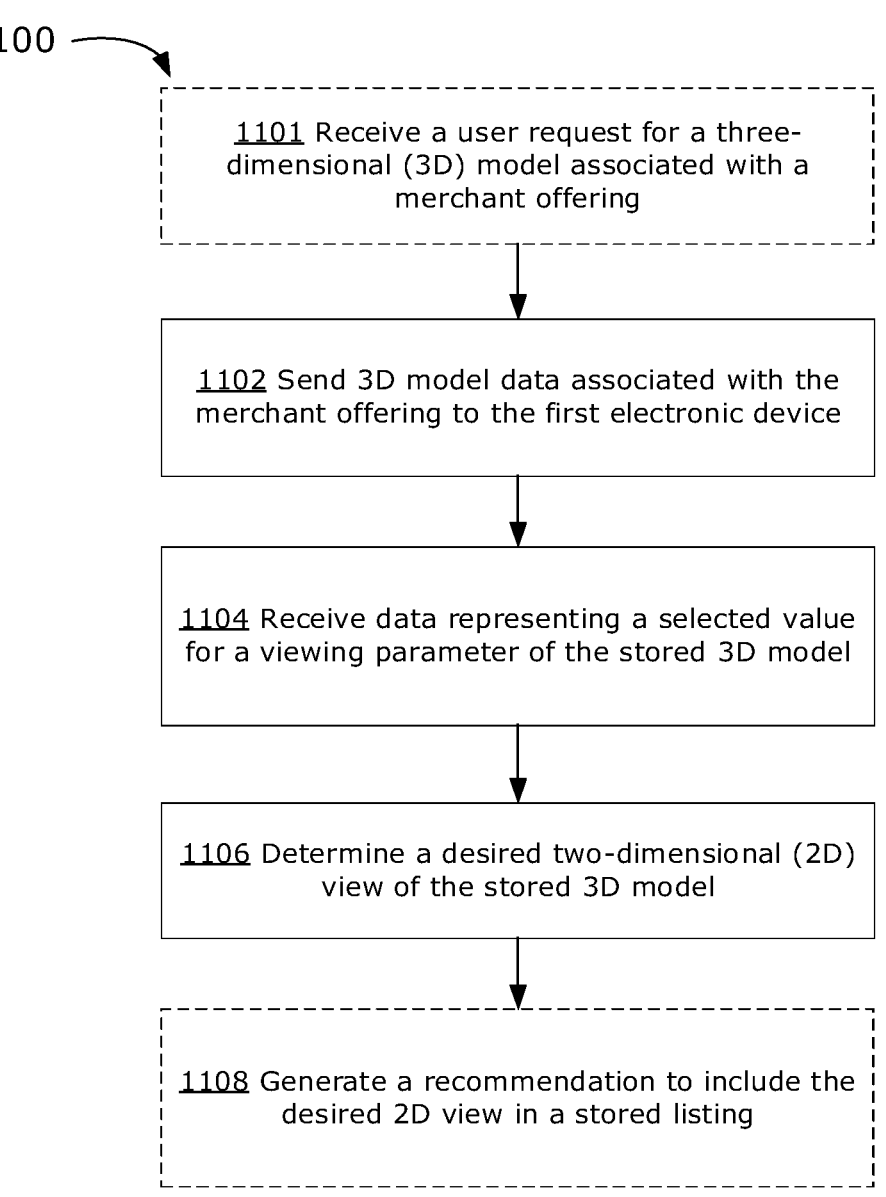

1101 Receive a user request for a three-dimensional (3D) model associated with a merchant offering 1102 Send 3D model data associated with the merchant offering to the first electronic device 1104 Receive data representing a selected value for a viewing parameter of the stored 3D model 1106 Determine a desired two-dimensional (2D) view of the stored 3D model 1108 Generate a recommendation to include the desired 2D view in a stored listing

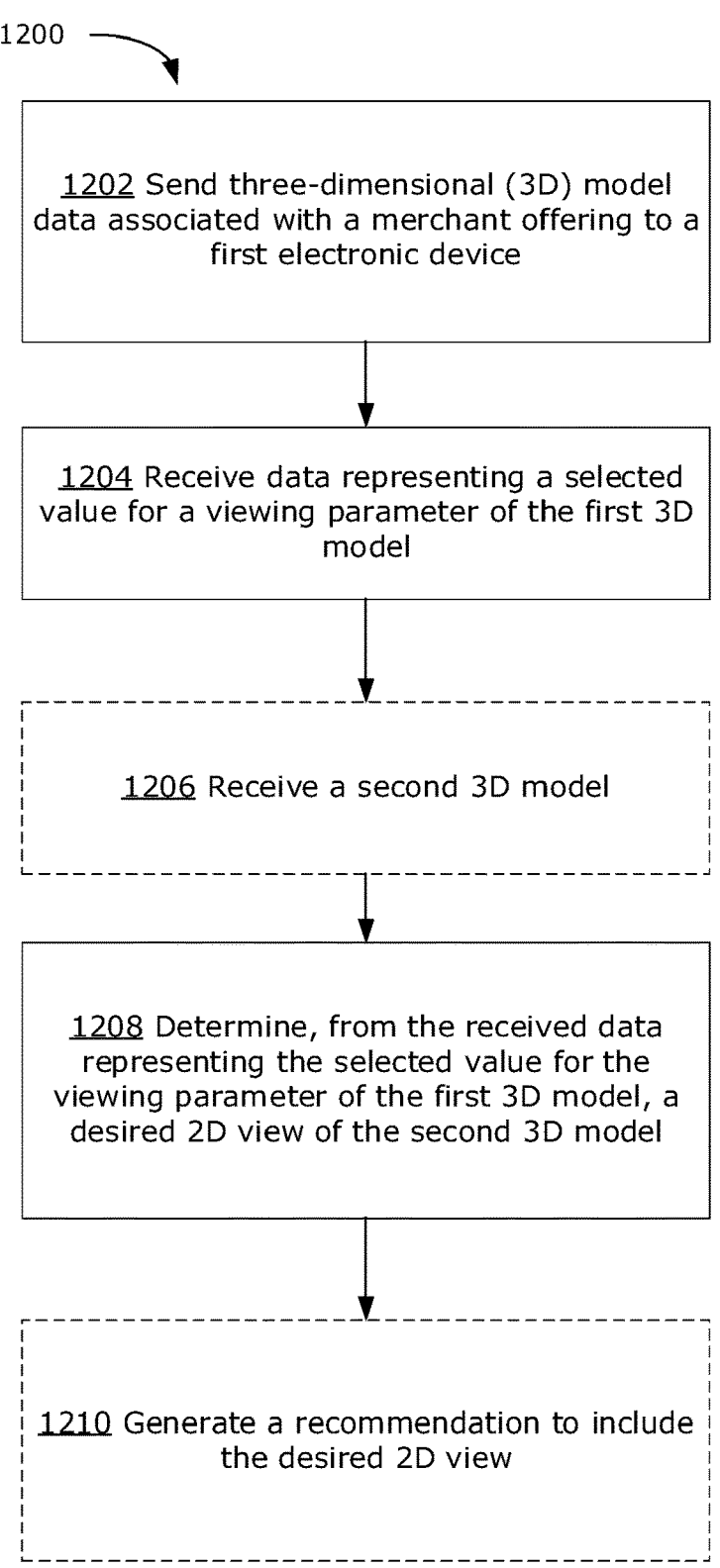

1202 Send three-dimensional (3D) model data associated with a merchant offering to a first electronic device 1204 Receive data representing a selected value for a viewing parameter of the first 3D model 1206 Receive a second 3D model 1208 Determine, from the received data representing the selected value for the viewing parameter of the first 3D model, a desired 2D view of the second 3D model 1210 Generate a recommendation to include the desired 2D view

FIG. 12

SYSTEMS, METHODS, AND NON-TRANSITORY COMPUTER-READABLE MEDIUM FOR RECOMMENDING 2D IMAGE

CROSS-REFERENCE TO RELATED APPLICATIONS

This application is a continuation of U.S. patent application Ser. No. 16/714,301 filed Dec. 13, 2019, the contents of which are incorporated by reference herein in its entirety.

FIELD

The present disclosure relates to systems and methods for recommending two-dimensional images, which may be implemented on an e-commerce platform.

BACKGROUND

An e-commerce platform may enable a customer to purchase merchant products (e.g., goods and/or services) from a merchant. Frequently, a customer may also use the e-commerce platform to discover (e.g., using a search service and/or a recommendation service provided by the e-commerce platform) merchant products that may be of interest.

A customer may view details of products (or services) prior to making a purchase on the e-commerce platform. Typically a merchant online store may list a variety of products and/or services, and each listing of an offering may have one or more images associated with the offering, from which at least one image can be a default image. The default image is typically the dominant image shown on the listing page for that offering. For example, the default image may be the largest image shown on the listing page among multiple images for a given offering. For another example, the default image may be the only image shown on the listing page, while additional images, if available, may be hidden from view. The right default image therefore may carry value in terms of making a good first impression for an offering by a merchant through the online store.

A customer may also use a general search engine (e.g., Google™) to search for a merchant offering, and the search engine may return multiple results based on the customer's search query. Some returned results may include an image associated with an online store or an offering matching the search query. A returned search result that includes an image can be a powerful tool in attracting potential customers and generating virtual foot traffic for a merchant's online store. Hence, it may be important to provide the most appropriate image to represent an online store or an offering, for responding to web-based search engine queries.

Conventionally, most merchants would not know which representative image should be selected as the default image in a listing or as the image for responding to a web-based search engine. Often a merchant would select a representative view (e.g., a product view that shows the entire product in a reasonable setting) without too much thought.

Improvements are therefore desired to assist in selection of images to include in a listing and/or to represent an online store.

SUMMARY

The present disclosure describes various examples in which 2D images are recommended based on 3D models. In some implementations, the 3D models are associated with a product offering in an online store. For example, a 2D view or 2D image may be recommended based on how customers manipulate or interact with a stored 3D model of a product offering in an online store. In some implementations, the interaction may happen in an augmented reality (AR) or virtual reality (VR) environment.

In some aspects of the present disclosure, a system for generating a recommendation for a 2D image based on a 3D model is provided. The system may include a processor in communication with a storage, the processor configured to execute instructions to cause the system to: send three-dimensional (3D) model data associated with a product offering of an online store to a first electronic device, the 3D model data being generated from a stored 3D model; receive, from the first electronic device, data representing a selected value for a viewing parameter of the stored 3D model; determine, from the received data, a desired two-dimensional (2D) view of the stored 3D model; and generate a recommendation, for a second electronic device, to include the desired 2D view in a stored listing associated with the product offering in the online store.

In some examples, the recommendation is generated after determining that the desired 2D view is absent in a stored listing for the product offering.

In some examples, the instructions further cause the system to: generate, from the stored 3D model, a 2D image corresponding to the desired 2D view.

In some examples, the instructions further cause the system to: compare between the generated 2D image and a current 2D image included in the stored listing for the product offering to determine that the desired 2D view is absent in the listing.

In some examples, the recommendation includes the 2D image or includes an option to update the stored listing with the 2D image.

In some examples, the selected value for the viewing parameter includes one of: a selected zoom level; a selected size of a virtual object generated based on the stored 3D model; a selected viewing angle; a selected orientation of the virtual object; or a selected visual property of the virtual object.

In some examples, the selected value for the viewing parameter is determined to be the selected value based on the stored 3D model being viewed at the selected value for the viewing parameter for a threshold dwell time.

In some examples, data representing a plurality of selected values for the viewing parameter of the stored 3D model are received from a respective plurality of customer electronic devices.

In some examples, the desired 2D view of the stored 3D model is determined from the received data, based on a statistical analysis of the plurality of selected values for the viewing parameter.

In some examples, the instructions further cause the system to cause the first electronic device to display the stored 3D model in a virtual reality environment.

In some examples, the instructions further cause the system to cause the first electronic device to display the stored 3D model in an augmented reality environment.

In some examples, the instructions further cause the system to associate at least one customer attribute with the selected value for the viewing parameter; and generate the recommendation to be specific to the at least one customer attribute.

In some aspects, the present disclosure provides a system for generating a recommendation for a 2D image for a second 3D model based on a first, different 3D model. The system may include a processor in communication with a storage, the processor configured to execute instructions to cause the system to: send three-dimensional (3D) model data associated with a product offering to a first electronic device, the 3D model data being generated from a first stored 3D model; receive, from the first electronic device, data representing a selected value for a viewing parameter of the first stored 3D model; determine, from the received data, a desired 2D view of a second stored 3D model associated with the same product offering or a different product offering, the first stored 3D model being determined to be relevant to the second stored 3D model; and generate a recommendation, for a second electronic device, to include the desired 2D view in a stored listing associated with the second stored 3D model.

In some examples, the first stored 3D model is determined to be relevant to the second stored 3D model on the basis of the first and second stored 3D models being associated with the same product offering.

In some examples, the first and second stored 3D models are associated with different product offerings, where the first stored 3D model is determined to be relevant to the second stored 3D model on the basis of the different product offerings belonging to a same category.

In some examples, wherein the instructions further cause the system to generate, from the second stored 3D model, a 2D image corresponding to the desired 2D view. The recommendation may include the generated 2D image or includes an option to update the stored listing associated with the second stored 3D model with the generated 2D image.

In some examples, data representing a plurality of selected values for the viewing parameter of the first stored 3D model may be received from a respective plurality of customer electronic devices. The desired 2D view of the second stored 3D model may be determined from the received data, based on a statistical analysis of the plurality of selected values for the viewing parameter.

In some aspects, the present disclosure describes a method. The method includes: sending three-dimensional (3D) model data associated with a product offering of an online store to a first electronic device, the 3D model data being generated from a stored 3D model; receiving, from the first electronic device, data representing a selected value for a viewing parameter of the stored 3D model; determining, from the received data, a desired two-dimensional (2D) view of the stored 3D model; and generating a recommendation, for a second electronic device, to include the desired 2D view in a stored listing associated with the online store.

In some examples, the recommendation is generated after determining that the desired 2D view is absent in a stored listing for the product offering.

In some examples, the method may include generating, from the stored 3D model, a 2D image corresponding to the desired 2D view.

In some examples, the method may include comparing between the generated 2D image and a current 2D image included in the stored listing for the product offering to determine that the desired 2D view is absent in the listing.

In some examples, the recommendation includes the 2D image or includes an option to update the stored listing with the 2D image.

In some examples, the selected value for the viewing parameter includes one of: a selected zoom level; a selected size of a virtual object generated based on the stored 3D model; a selected viewing angle; a selected orientation of the virtual object; or a selected visual property of the virtual object.

In some examples, the selected value for the viewing parameter is determined to be the selected value based on the stored 3D model being viewed at the selected value for the viewing parameter for a threshold dwell time.

In some examples, data representing a plurality of selected values for the viewing parameter of the stored 3D model are received from a respective plurality of customer electronic devices.

In some examples, the desired 2D view of the stored 3D model is determined from the received data, based on a statistical analysis of the plurality of selected values for the viewing parameter.

In some examples, the method may include causing the first electronic device to display the stored 3D model in a virtual reality environment.

In some examples, the method may include causing the first electronic device to display the stored 3D model in an augmented reality environment.

In some examples, the method may include: associating at least one customer attribute with the selected value for the viewing parameter; and generating the recommendation to be specific to the at least one customer attribute.

BRIEF DESCRIPTION OF THE DRAWINGS

Reference will now be made, by way of example, to the accompanying drawings which show example embodiments of the present application, and in which:

FIG. 11 is a flow chart of an example method, which may be performed by the e-commerce platform of FIG. 1, to generate a recommendation for a 2D image based on a 3D model; and FIG. 12 is a flow chart of another example method, which may be performed by the e-commerce platform of FIG. 1, to generate a recommendation for a 2D image based on a 3D model.

Similar reference numerals may have been used in different figures to denote similar components.

DESCRIPTION OF EXAMPLE EMBODIMENTS

The present disclosure will be described in the context of an e-commerce platform, discussed below. However, it should be understood that this discussed is only for the purpose of illustration and is not intended to be limiting. Further, it should be understood that the present disclosure may be implemented in other contexts, and is not necessarily limited to implementation in an e-commerce platform.

Figure 1:
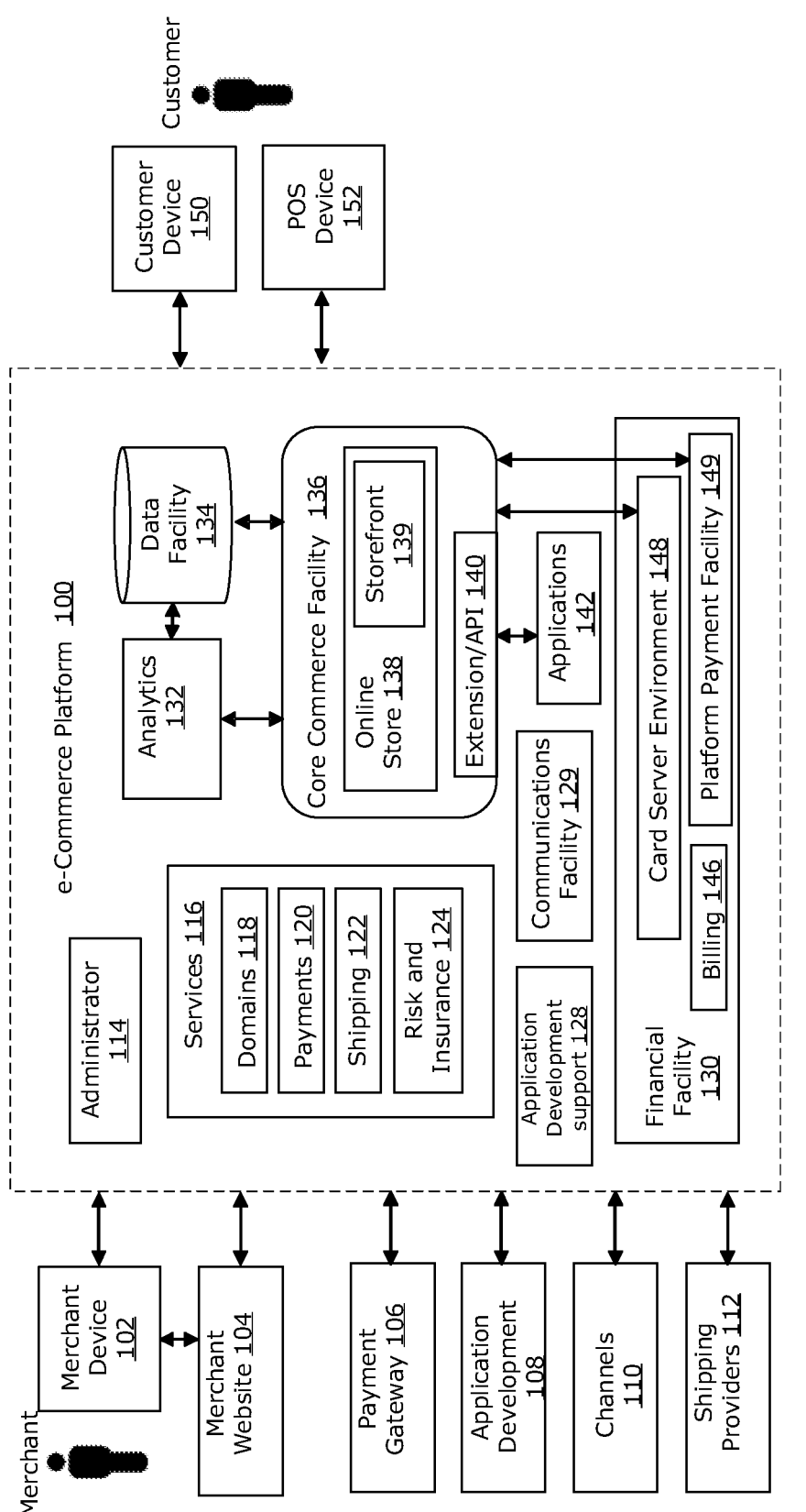
FIG. 1 is a block diagram of an example e-commerce platform, in which examples described herein may be implemented.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products or services. All references to products throughout this disclosure should also be understood to be references to products and/or services, including physical products, digital content, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110, through point of sale (POS) devices 152 in physical locations (e.g., a physical storefront or other location such as through a kiosk, terminal, reader, printer, 3D printer, and the like), by managing their business through the e-commerce platform 100, by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., ' brick-and-mortar' retail stores), a merchant off-platform website 104 (e.g., a commerce Internet website or other Internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts 139. In various embodiments, merchants may manage one or more storefronts 139 in the online store 138, such as through a merchant device 102 (e.g., computer, laptop computer, mobile computing device, and the like), and offer products to customers through a number of different channels 110 (e.g., an online store 138; a physical storefront through a POS device 152; electronic marketplace, through an electronic buy button integrated into a website or social media channel such as on a social network, social media page, social media messaging system; and the like). A merchant may sell across channels 110 and then manage their sales through the e-commerce platform 100. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront 139 through the online store 138, and utilizing the communications facility 129 to leverage customer interactions and analytics 132 to improve the probability of sales, for example. Throughout this disclosure the terms online store 138 and storefront 139 may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In various embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through various features of the platform or stand-alone applications, dialog via electronic communication, and the like, providing a system for reaching customers and facilitating merchant services for the real or virtual pathways available for reaching and interacting with customers.

In various embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application development 108, channels 110, shipping providers 112, customer devices 150, POS devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a thin client via a web browser, accessed through by POS devices, and the like). In various embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality). In embodiments, features or applications of the platform may be implemented via a peer to peer network, such as between a customer device and a merchant device.

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In various embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their web site through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110, including the online store 138, over the telephone, as well as through physical POS devices 152 as described herein. The e-commerce platform 100 may include business support services 116, an administrator 114, and the like associated with running an online business, such as providing a domain service 118 associated with their online store, payment services 120 for facilitating transactions with a customer, shipping services 122 for providing customer shipping options for purchased products, risk and insurance services 124 associated with product protection and liability, merchant billing services 146, and the like. Services 116 may be provided via the e-commerce platform 100 or in association with external facilities, such as through a payment gateway 106 for payment processing, shipping providers 112 for expediting the shipment of products, and the like.

In various embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
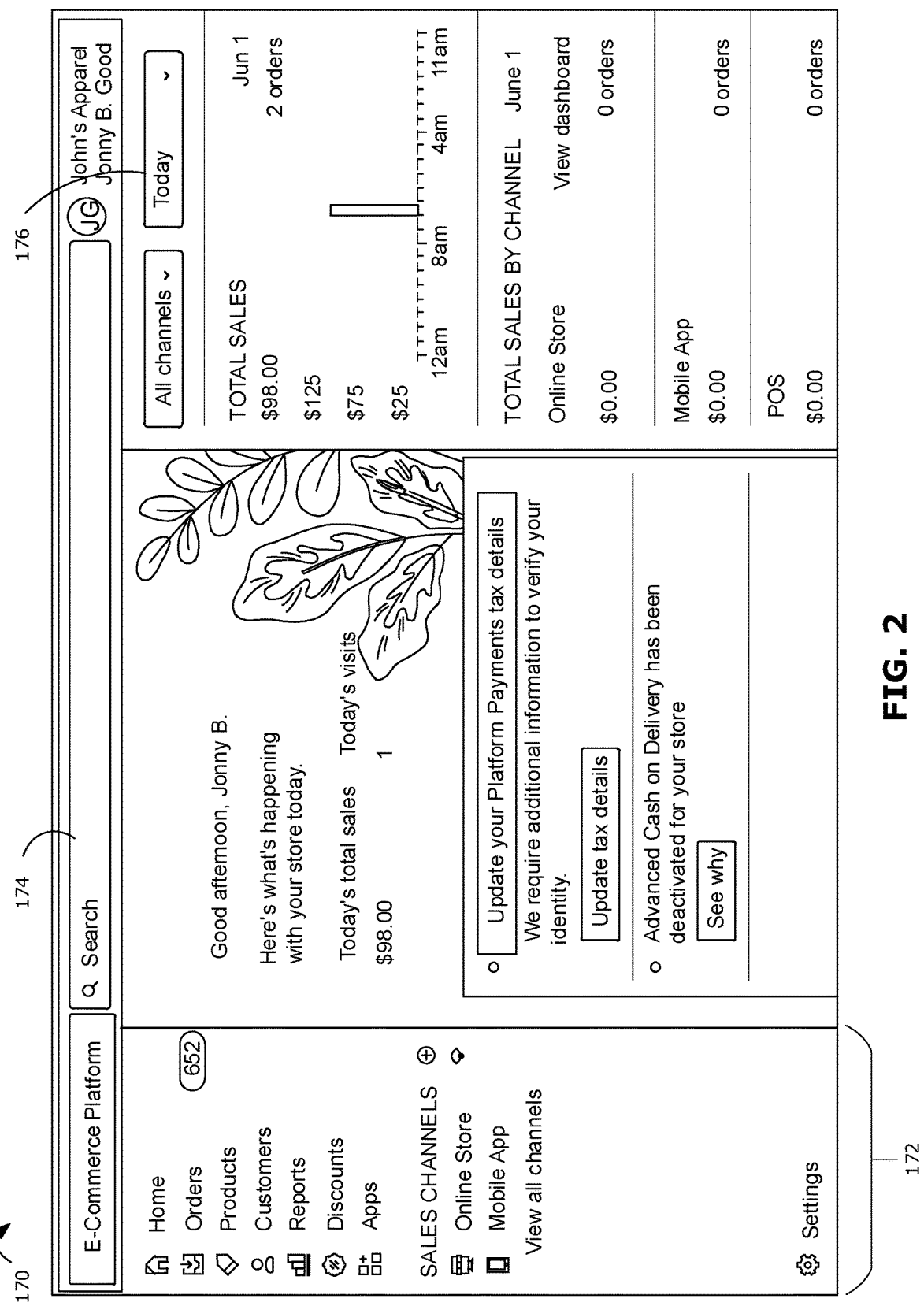
FIG. 2 is an example homepage of an administrator, which may be accessed via the e-commerce platform of FIG. 1.

FIG. 2 depicts a non-limiting embodiment for a home page 170 of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar 172, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar 174 to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g., via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110 from different periods of time (e.g., days, weeks, months, and the like), such as by using drop-down menus 176. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in various embodiments, the e-commerce platform 100 may be configured with a core commerce facility 136 for content management, task automation and data management to enable support and services to the plurality of online stores 138 (e.g., related to products, inventory, customers, orders, collaboration, suppliers, reports, financials, risk and fraud, and the like), but be extensible through applications 142 that enable greater flexibility and custom processes required for accommodating an ever-growing variety of merchant storefronts 139, POS devices 152, products, and services. For instance, the core commerce facility 136 may be configured for flexibility and scalability through portioning (e.g., sharding) of functions and data, such as by customer identifier, order identifier, storefront identifier, and the like. The core commerce facility 136 may accommodate store-specific business logic and a web administrator. The online store 138 may represent a channel, be embedded within the core commerce facility 136, provide a set of support and debug tools that support uses for merchants, and the like. The core commerce facility 136 may provide centralized management of critical data for storefronts 139.

The core commerce facility 136 includes base or "core" functions of the e-commerce platform 100, and as such, as described herein, not all functions supporting online stores 138 may be appropriate for inclusion. For instance, functions for inclusion into the core commerce facility 136 may need to exceed a core functionality threshold through which it may be determined that the function is core to a commerce experience (e.g., common to a majority of storefront activity, such as across channels, administrator interfaces, merchant locations, industries, product types, and the like), is reusable across online stores 138 (e.g., functions that can be re-used/modified across core functions), limited to the context of a single storefront at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the core commerce facility 136 to remain responsive, as many required features are either served directly by the core commerce facility 136 or enabled by its extension/application programming interface (API) 140 connection to applications 142. If care is not given to restricting functionality in the core commerce facility 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the core commerce facility 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In various embodiments, rather than violating the isolation principle, it may be preferred to move these components out of the core commerce facility 136 and into their own infrastructure within the e-commerce platform 100. For example, the data facility 134, and analytics 132 may be located outside the core commerce facility 136.

In various embodiments, the e-commerce platform 100 may provide for a platform payment facility 149, which is another example of a component that utilizes data from the core commerce facility 136 but may be located outside so as to not violate the isolation principle. The platform payment facility 149 may allow customers interacting with online stores 138 to have their payment information stored safely by the core commerce facility 136 such that they only have to enter it once. When a customer visits a different online stores 138, even if they've never been there before, the platform payment facility 149 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from a storefront's checkout, allowing information to be made available globally across online stores 138. It would be difficult and error prone for each online store 138 to be able to connect to any other online store 138 to directly retrieve the payment information stored there. As a result, the platform payment facility 149 may be implemented external to the core commerce facility 136.

For those functions that are not included within the core commerce facility 136, applications 142 provide a way to add features to the e-commerce platform 100. Applications 142 may be able to access and modify data on a merchant's online store 138, perform tasks through the administrator

114, create new flows for a merchant through a user interface (e.g., that is surfaced through extensions/API 140), and the like. Merchants may be enabled to discover and install applications 142 through application searching 208 and application recommendations 210 (see FIG. 3). In various embodiments, core products, core extension points, applications, and the administrator 114 may be developed to work together. For instance, application extension points may be built inside the administrator 114 so that core features may be extended by way of applications 142, which may deliver functionality to a merchant through the extension/API 140.

In various embodiments, applications 142 may deliver functionality to a merchant through the extension/API 140, such as where an application 142 is able to surface transaction data to a merchant (e.g., App: "Surface my app in mobile and web admin using the embedded app SDK"), and/or where the core commerce facility 136 is able to ask the application to perform work on demand (core: "App, give me a local tax calculation for this checkout").

Applications 142 may support storefronts 139 and channels 110, provide merchant support, integrate with other services, and the like. Where the core commerce facility 136 may provide the foundation of services to the storefront 139, the applications 142 may provide a way for merchants to satisfy specific and sometimes unique needs. Different merchants will have different needs, and so may benefit from different applications 142. Applications 142 may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142 may be connected to the core commerce facility 136 through an extension/API layer 140, such as utilizing APIs to expose the functionality and data available through and within the core commerce facility 136 to the functionality of applications (e.g., through REST, GraphQL, and the like). For instance, the e-commerce platform 100 may provide API interfaces to merchant and partner-facing products and services, such as including application extensions, process flow services, developer-facing resources, and the like. With customers more frequently using mobile devices for shopping, applications 142 related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the core commerce facility 136, thus providing merchants what they need when they need it. For instance, shipping services 122 may be integrated with the core commerce facility 136 through a shipping or carrier service API, thus enabling the e-commerce platform 100 to provide shipping service functionality without directly impacting code running in the core commerce facility 136.

Many merchant problems may be solved by letting partners improve and extend merchant workflows through application development, such as problems associated with backoffice operations (merchant-facing applications) and in the storefront (customer-facing applications). As a part of doing business, many merchants will use mobile and web related applications on a daily basis for back-office tasks (e.g., merchandising, inventory, discounts, fulfillment, and the like) and storefront tasks (e.g., applications related to their online shop, for flash-sales, new product offerings, and the like), where applications 142, through extension/API 140, help make products easy to view and purchase in a fast growing marketplace. In various embodiments, partners, application developers, internal applications facilities, and the like, may be provided with a software development kit (SDK), such as through creating a frame within the administrator 114 that sandboxes an application interface. In various embodiments, the administrator 114 may not have control over nor be aware of what happens within the frame. The SDK may be used in conjunction with a user interface kit to produce interfaces that mimic the look and feel of the e-commerce platform 100, such as acting as an extension of the core commerce facility 136.

Applications 142 that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the core commerce facility 136, such as for synchronizing a local database, notifying an external integration partner, and the like. Update events may enable this functionality without having to poll the core commerce facility 136 all the time to check for updates, such as through an update event subscription. In various embodiments, when a change related to an update event subscription occurs, the core commerce facility 136 may post a request, such as to a predefined callback URL. The body of this request may contain a new state of the object and a description of the action or event. Update event subscriptions may be created manually, in the administrator facility 114, or automatically (e.g., via the API). In various embodiments, update events may be queued and processed asynchronously from a state change that triggered them, which may produce an update event notification that is not distributed in real-time.

Figure 3:
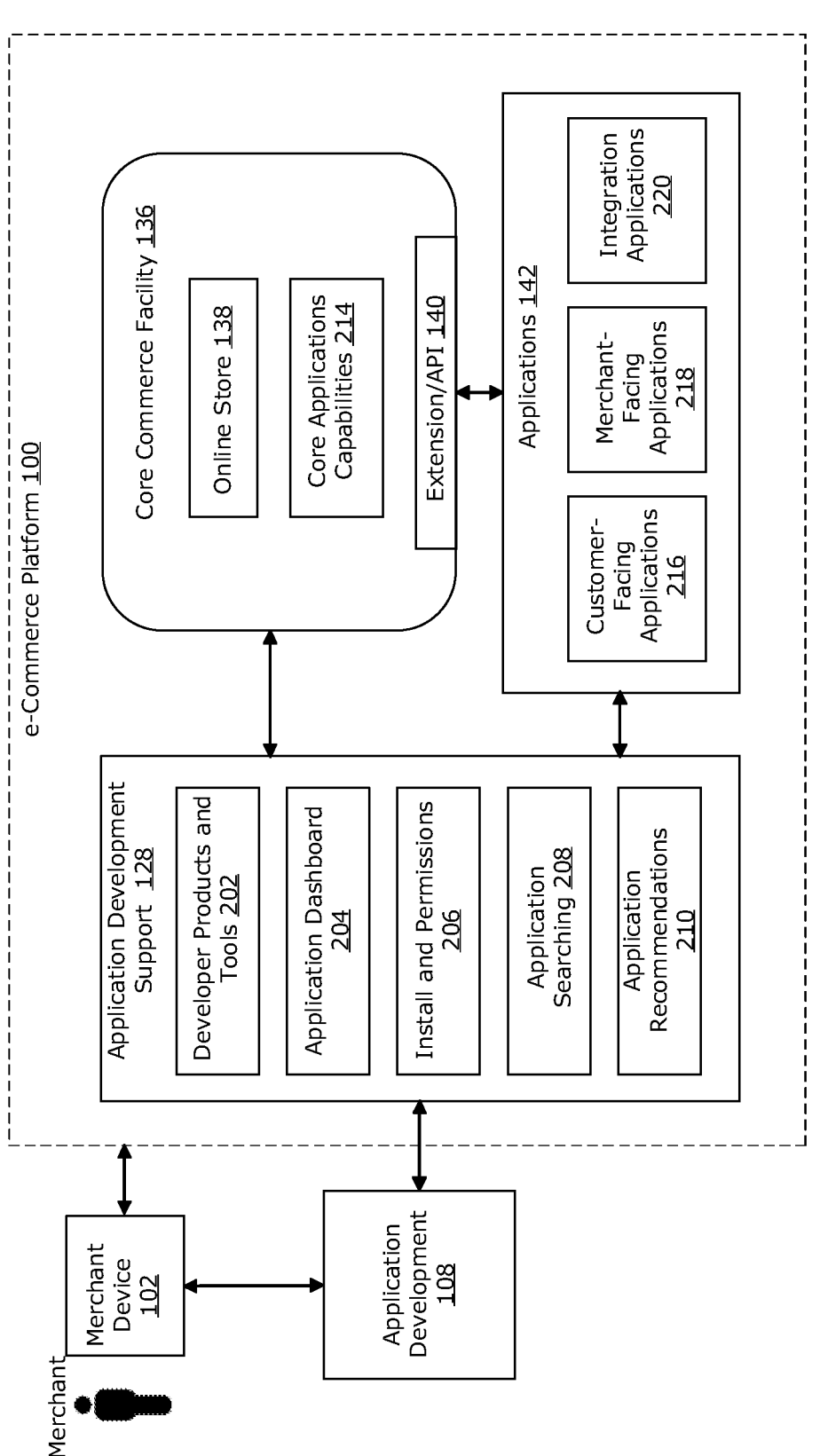
FIG. 3 is another block diagram of the e-commerce platform of FIG. 1, showing some details related to application development.

Reference is made to FIG. 3, which is another depiction of the e-commerce platform 100. FIG. 3 omits some details that have been described with reference to FIG. 1, and shows further details discussed below. In various embodiments, the e-commerce platform 100 may provide application development support 128. Application development support 128 may include developer products and tools 202 to aid in the development of applications, an application dashboard 204 (e.g., to provide developers with a development interface, to administrators for management of applications, to merchants for customization of applications, and the like), facilities for installing and providing permissions 206 with respect to providing access to an application 142 (e.g., for public access, such as where criteria must be met before being installed, or for private use by a merchant), application searching 208 to make it easy for a merchant to search for applications 142 that satisfy a need for their online store 138, application recommendations 210 to provide merchants with suggestions on how they can improve the user experience through their online store 138, a description of core application capabilities 214 within the core commerce facility 136, and the like. These support facilities may be utilized by application development 108 performed by any entity, including the merchant developing their own application 142, a third-party developer developing an application 142 (e.g., contracted by a merchant, developed on their own to offer to the public, contracted for use in association with the e-commerce platform 100, and the like), or an application being developed by internal personal resources associated with the e-commerce platform 100. In various embodiments, applications 142 may be assigned an application identifier (ID), such as for linking to an application (e.g., through an API), searching for an application, making application recommendations, and the like.

The core commerce facility 136 may include base functions of the e-commerce platform 100 and expose these functions through APIs to applications 142. The APIs may enable different types of applications built through application development 108. Applications 142 may be capable of satisfying a great variety of needs for merchants but may be grouped roughly into three categories: customer-facing applications 216, merchant-facing applications 218, or integration applications 220. Customer-facing applications 216 may include online store 138 or channels 110 that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 218 may include applications that allow the merchant to administer their online store 138 (e.g., through applications related to the web or website or to mobile devices), run their business (e.g., through applications related to POS devices 152), to grow their business (e.g., through applications related to shipping (e.g., drop shipping), use of automated agents, use of process flow development and improvements), and the like. Integration applications 220 may include applications that provide useful integrations that participate in the running of a business, such as shipping providers 112 and payment gateways.

In various embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142 so that the core commerce facility 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110, evaluates one or more products such as via an augmented reality application, adds what they intend to buy to their cart, proceeds to checkout, and pays for the content of their cart resulting in the creation of an order for the merchant. The merchant may then view and fulfill (or cancel) the order. The product is then delivered to the customer. If the customer is not satisfied, they might return the products to the merchant.

In an example embodiment, a customer may browse a merchant's products on a channel 110. A channel 110 is a place where customers can view and buy products. In various embodiments, channels 110 may be modeled as applications 142 (a possible exception being the online store 138, which is integrated within the core commence facility 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options), and at least one variant may have a default product image for display. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D models or images, rotating view images, animated images, through a virtual or augmented reality interface, and the like.

In various embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., "secret" strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110 may use the core commerce facility 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through the card server environment 148. In various embodiments, the payment gateway 106 may accept international payment, such as integrating with leading international credit card processors. The card server environment 148 may include a card server application, card sink, hosted fields, and the like. This environment may act as the secure gatekeeper of the sensitive credit card information.

Figure 4:
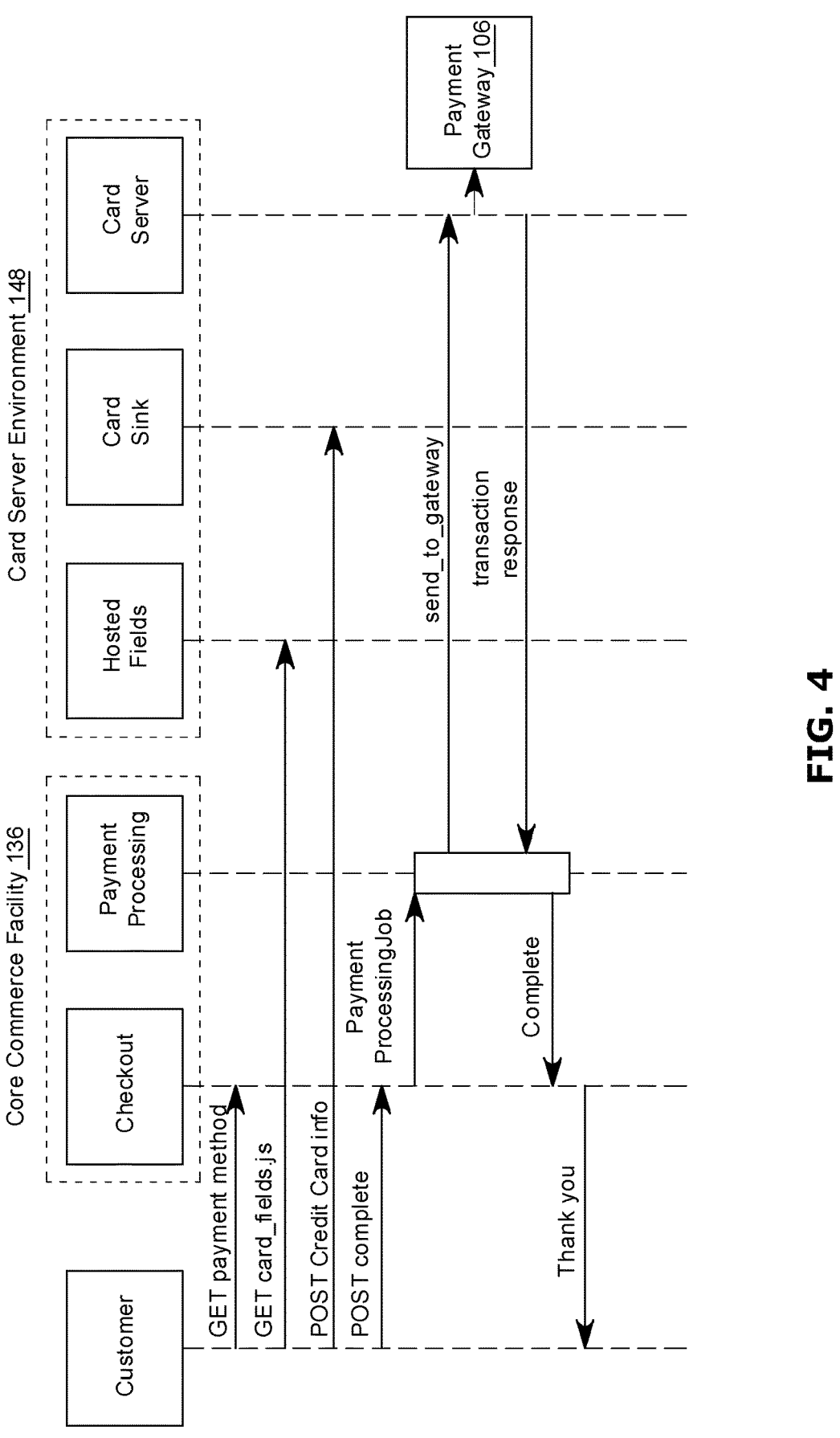
FIG. 4 shows an example data flow that may take place when a purchase is made using the e-commerce platform of FIG. 1.

FIG. 4 presents, in a non-limiting example, a simplified sequence diagram of the interactions between the core commerce facility 136 and the card server environment 148 during payment processing of a credit, prepaid, gift or other card on a Web Checkout.

In various embodiments, most of the process may be orchestrated by a payment processing job. The core commerce facility 103 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110 that do not rely on core commerce facility checkouts may use an order API to create orders. Once an order is created, an order confirmation notification may be sent to the customer and an order placed notification sent to the merchant via a notifications component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor). The merchant may then view and fulfill (or cancel) the order.

Figure 5:
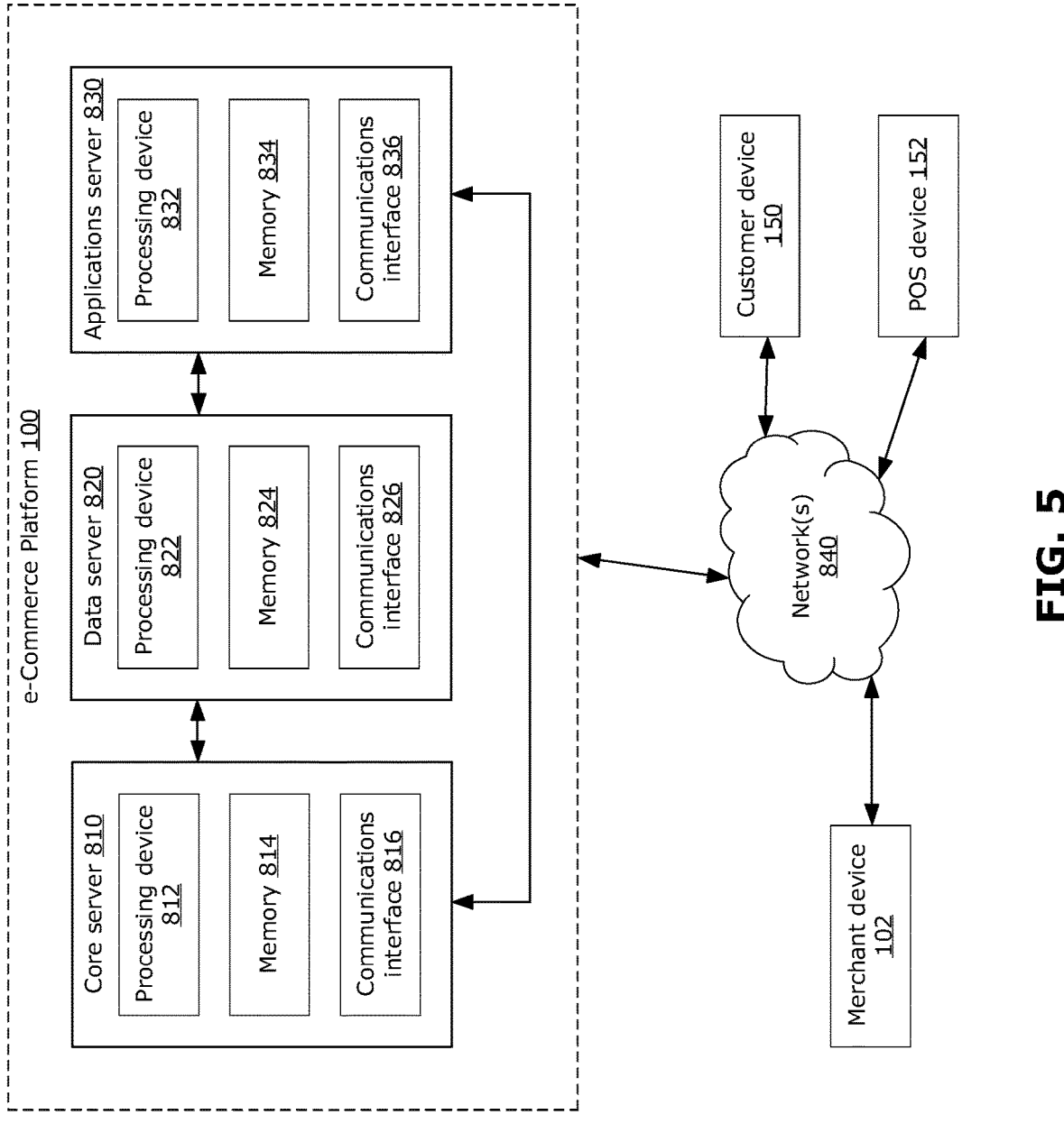
FIG. 5 is a block diagram of an example hardware configuration of the e-commerce platform.

FIG. 5 is a block diagram of an example hardware configuration of the e-commerce platform 100. In this example, the e-commerce platform 100 includes a core server 810, a data server 820 and an applications server 830, which are each in communication with each other (e.g., via wired connections and/or via wireless intranet connections). Each of the servers 810, 820, 830 include a respective processing device 812, 822, 832 (each of which may be, for example, a microprocessor, graphical processing unit, digital signal processor or other computational element), a respective memory 814, 824, 834 (each of which may be, for example, random access memory (RAM), read only memory (ROM), hard disk, optical disc, subscriber identity module (SIM) card, memory stick, secure digital (SD) memory card, and the like, and may include tangible or transient memory), and a respective communications interface 816, 826, 836 (each of which may include transmitter, receiver and/or transceiver for wired and/or wireless communications). The core server 810 may store instructions and perform operations relevant to core capabilities of the e-commerce platform, such as providing the administrator 114, analytics 132, core commerce facility 136, services 116 and/or financial facility 130, among others. The data server 820 may be used to implement the data facility 134, including the reviews database 310, the profiles database 320 and the keywords database 330, among others. The applications server 830 may store instructions and perform operations relevant to the applications 142, such as storing instructions and data for the applications 142 and for implementing application development support 128.

Merchants and customers, using respective devices 102, 150, 152 may access the e-commerce platform 100 via one or more networks 840 (e.g., wired and/or wireless networks, including a virtual private network (VPN), the Internet, and the like).

Although FIG. 5 illustrates an example hardware implementation of the e-commerce platform 100, it should be understood that other implementations may be possible. For example, there may be greater or fewer numbers of servers, the e-commerce platform 100 may be implemented in a distributed manner, or at least some of the memories 814, 824, 834 may be replaced with external storage or cloud-based storage, among other possible modifications.

Figure 6:
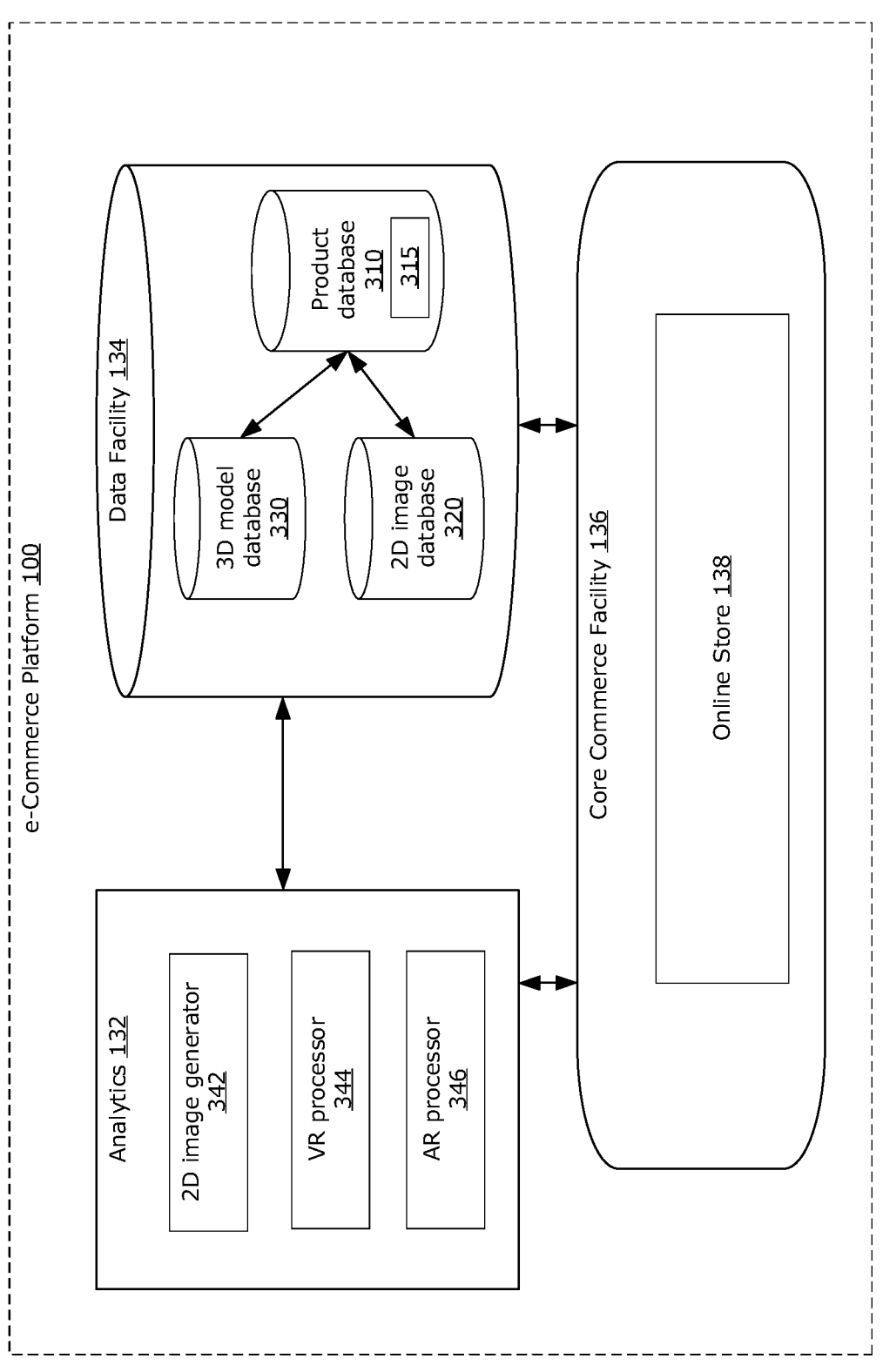
FIG. 6 is another block diagram of the e-commerce platform of FIG. 1, showing some details related to processing 3D models.

Reference will now be made to FIG. 6, which is another depiction of the e-commerce platform 100, showing further details discussed below. In particular, FIG. 6 illustrates some details of the data facility 134 and the analytics facility 132 that are relevant to generating 2D images based on a 3D model associated with a merchant offering at an online store 138. For simplicity, the following discussion will refer to a merchant product. However, it should be understood that the present disclosure may be applicable to merchant offerings in general, including services. For example, a 3D model and 2D image may be relevant to a service that involves a physical object, such as a car rental service (in which case a 3D model of the rental car may be relevant).

The data facility 134 may store merchant product information for each product listed in an online store 138. In this example, the data facility 134 includes a product database 310 containing data of one or more merchant products for one or more online stores 138, a 2D image database 320 containing 2D image data of one or more merchant products for one or more online stores 138, and a 3D model database 330 containing 3D models of one or more merchant products for one or more online stores 138. In some embodiments, a 3D model of a product may be stored as a collection of data for the 3D model, which may include a collection of points and other associated information in a 3D space. In some embodiments, a 3D model of a product may be stored in a common 3D file format (e.g., GLTF, GLB, USDZ, STL, OBJ, FBX, COLLADA, 3DS, IGES, STEP, and VRML/X3D) that can be read and rendered to a 3D model via common 3D software such as Autodesk™, CAD™, SOLID-WORKS™, and so on.

An online store 138 may list a merchant product such as a chair; the listing for the chair may be stored as a data entry

315 in the product database 310. The data entry 315 for the chair in the product database 310 may have a reference (e.g., a memory address) for one or more 2D images (e.g., see FIG. 7) stored in the 2D database 320, as well as a reference (e.g., a memory address) for one or more 3D models (e.g., see FIG. 8) stored in the 3D database 330. In some embodiments, the product database 310 may include the 3D model database 330 and/or the 2D image database 320. In other embodiments, each of the databases 310, 320, 330 may be a separate database.

In some embodiments, a 3D model may be a virtual object in a database or other repository of virtual objects. In some embodiments, the virtual object may be created (e.g., using 2D to 3D conversion software) from a photograph or video of a real object, for example created using a mobile or other device.

For each product in a stored listing of an online store 138, there may be a default image for the product among the one or more 2D images stored in the 2D image database 320. The default image may, in some embodiments, be the dominant image (e.g., the largest image on a product landing page) shown by default among multiple images for the product. In other embodiments, the default image may be the only image shown for the product by default. This default image is often the first product image seen by customers for a product listed in the online store 138 and therefore may be important for driving sales for the product.

The analytics facility 132 in this example includes a 2D image generator 342, a Virtual Reality (VR) processor 344, and an Augmented Reality (AR) processor 346. Each of the VR processor 344 and AR processor 346 may include hardware components, software or any combination of the two. Each of the 2D image generator 342, the VR processor 344, and the AR processor 346 may be implemented as separate sub-modules of the analytics facility 132. In some examples, the functions of one or more of the 2D image generator 342 and the VR processor 344, and the AR processor 346 may be provided using a single sub-module (instead of three separate sub-modules) or implemented as general functions of the analytics facility 132. As will be discussed further below, one or more of the 2D image generator 342, the VR processor 344, and the AR processor 346 may be implemented using a machine-learning system.

It should be noted that the data facility 134, analytics facility 132, and core commerce facility 136 may be implemented in separate hardware components, but may be taken together as part of the single-entity e-commerce platform 100.

As a customer browses a product in a storefront 139 (e.g., as displayed on a customer electronic device 150), the customer may view various images of the product, including for example 2D images and 3D images. A customer may be able to view a 3D model of a product rendered based on 3D model data of the product stored in the 3D image database 330.

Figure 7:
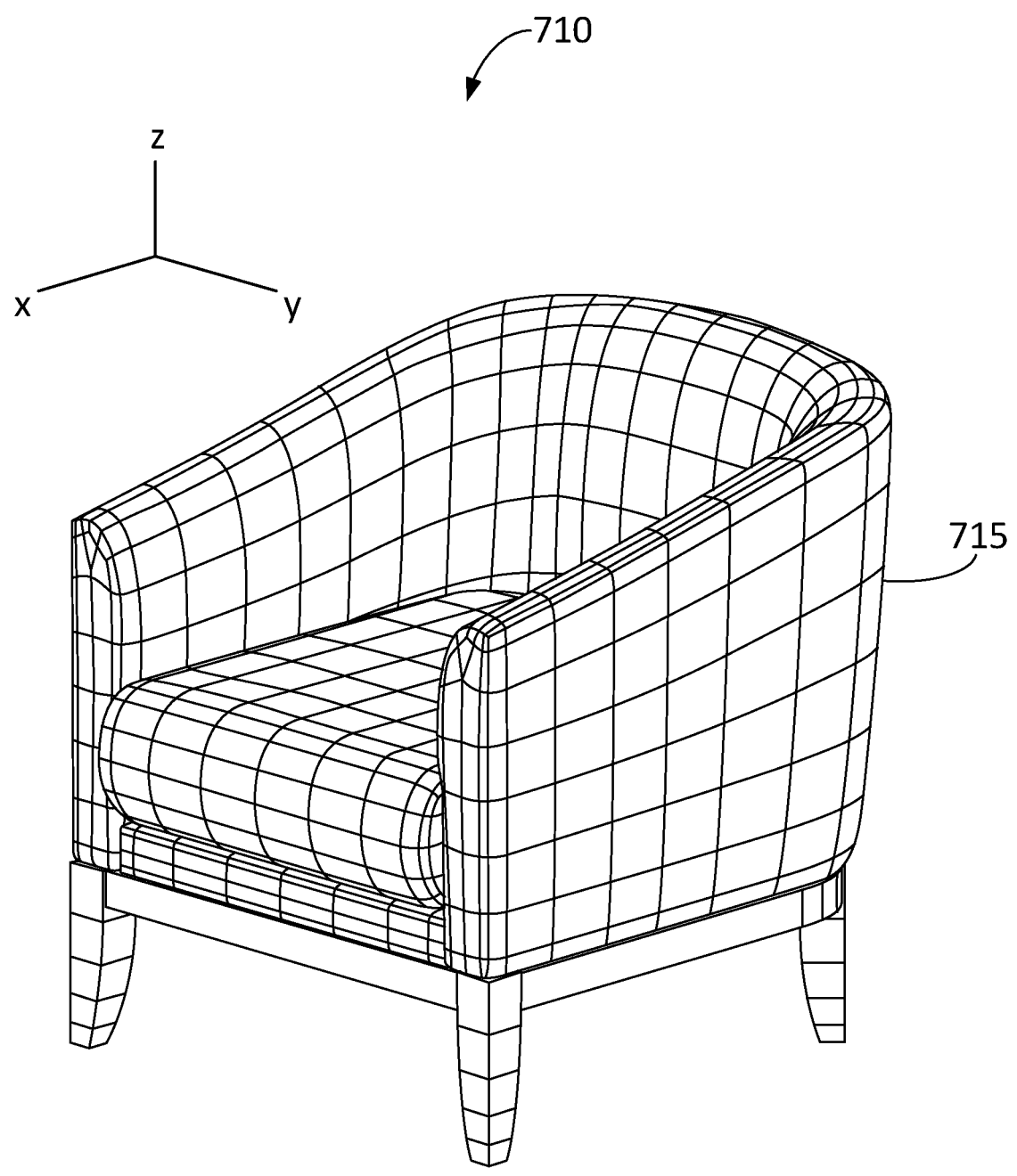
FIG. 7 shows an example 3D model of a product, which may be stored by the e-commerce platform of FIG. 1.
Figure 8:
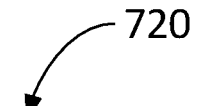
FIG. 8 shows an example 2D view rendered by the 3D model in FIG. 7.
Figure 8:
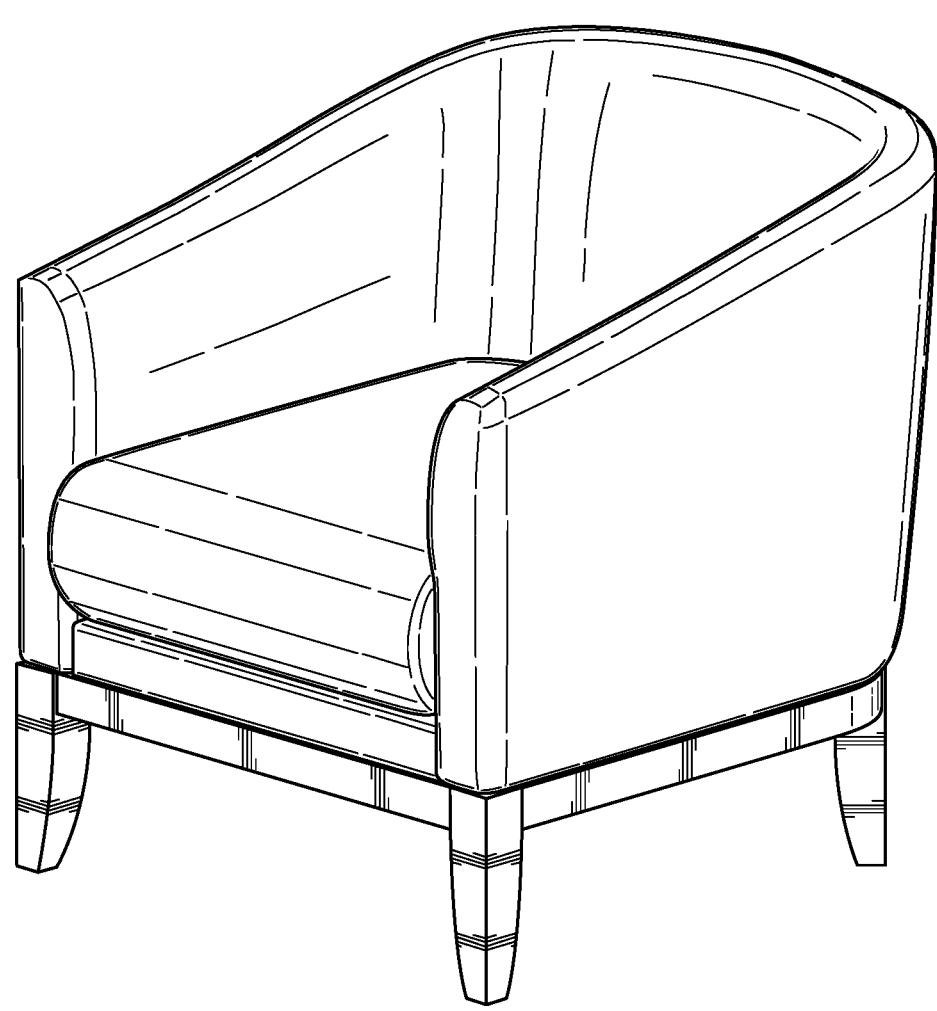

FIG. 7 shows an example 3D model 710 of a chair, an example product offered by a merchant through an online store. The 3D model 710 may be formed at least by a large amount of points (which may be collectively known as a "point cloud") 715 in a 3D space with a Cartesian (e.g., XYZ) coordinate system, which has an origin (0, 0, 0) at the center of the model 710. The point cloud may be stored as 3D model data in the 3D image database 330. Each point P in the point cloud 715 has a specific coordinate $(x_p, y_p, z_p)$ in the coordinate system. While FIG. 7 only shows a group of points 715 and lines formed thereby, 3D model data for a product may also include other information such as color (which may include a color mesh, e.g. triangulated or quad-angulated meshes), texture, material type, transparency level, lighting, shadow and so on. An application, such as a browser or a specifically configured shopping application, on the customer electronic device 150 may receive the 3D model data including the point cloud 715, then render and display a 2D image 720 of a rendered 3D model on a display, as shown in FIG. 8.

Even though the Cartesian coordinate system has been described in some embodiments, it is to be appreciated that one can also, in other embodiments, use the spherical coordinate system or the cylindrical coordinate system to build and represent a 3D model.

The 3D model data for the 3D model 710 may be provided by the e-commerce platform 100 to a customer's electronic device 150, to enable the customer to view the 3D model 710. When a 3D model 710 of a product is presented to a customer on a display screen of the electronic device 150, it may be rendered to show a 2D image 720 of the 3D model in a specific setting, as shown in FIG. 8. In some embodiments, the specific setting for rendering a 2D image may be based on a specific viewpoint. The setting may include one or more viewing parameters, such as a zoom level, an image size, a viewpoint, a viewing angle (also known as an orientation), a distance from the origin, one or more visual properties (e.g., color, texture, lighting, etc.) and so on.

Figure 9:
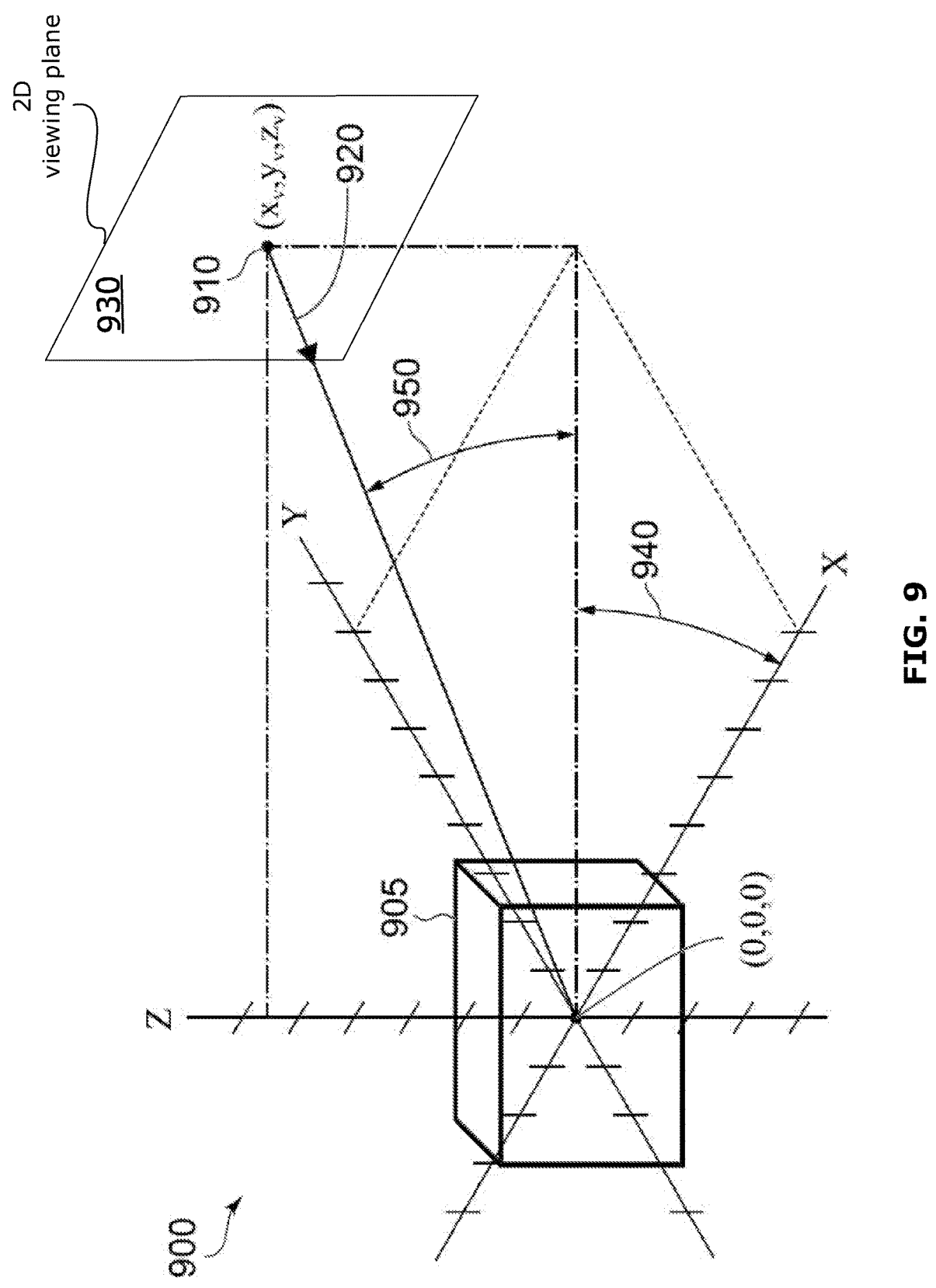
FIG. 9 is a schematic diagram showing a 3D model situated in a 3D coordinate system and an example 2D view being generated based on a view point.

Referring now to FIG. 9, there is shown a 3D model 905 (simplified to a square box in dot-dash lines), with its center overlapping with the origin (0, 0, 0) of a 3D coordinate system 900. The coordinate system 900 has three axis X, Y, and Z. As the 3D model 905 is viewed from a specific position of observation or "viewpoint" 910 (e.g., by a human, or a real or virtual camera), the viewpoint has a coordinate $(x_v, y_v, z_v)$ in the coordinate system 900. A straight line connecting the origin (0, 0, 0) and the viewpoint $(x_v, y_v, z_v)$ forms a view direction 920, which has an angle 940 from X axis, and an angle 950 from the XY plane. A 2D viewing plane 930 can be obtained by generating a 2D plane that is perpendicular to the view direction 920 at the viewpoint $(x_v, y_v, z_v)$. The 2D viewing plane 930 may be used to generate a 2D image from the 3D model 905, for example by projecting the 3D model 905 onto the 2D image plane 930. A 3D model 905 may have any number of 2D images rendered, each being a projection of the 3D model 905 to a respective viewing plane 930 as determined by the respective viewpoint 910 and the respective view direction 920.

When the electronic device 150 first renders the 3D model using the 3D model data sent by the e-commerce platform 100, a default 2D view of the 3D model may be shown. This default 2D view may have a plurality of viewing parameters including, for instance, a zoom level of 1.5, an image size of 1000×1000 pixels, a viewpoint Vat position coordinate $(x_v, y_v, z_v)$, a viewing angle of (45°, 60°) i.e., 45 degrees from X axis and 60 degrees from XY plane, and a distance of 100 (units) from the origin as measured between the origin and the viewpoint. In addition, for each point in the 3D model 710, a separate colour, texture, and lighting setting may apply. Based on the viewing parameter value(s) in a specific setting, the electronic device 150 can render a specific 2D view 720 of the 3D model 710.

Figure 10A:
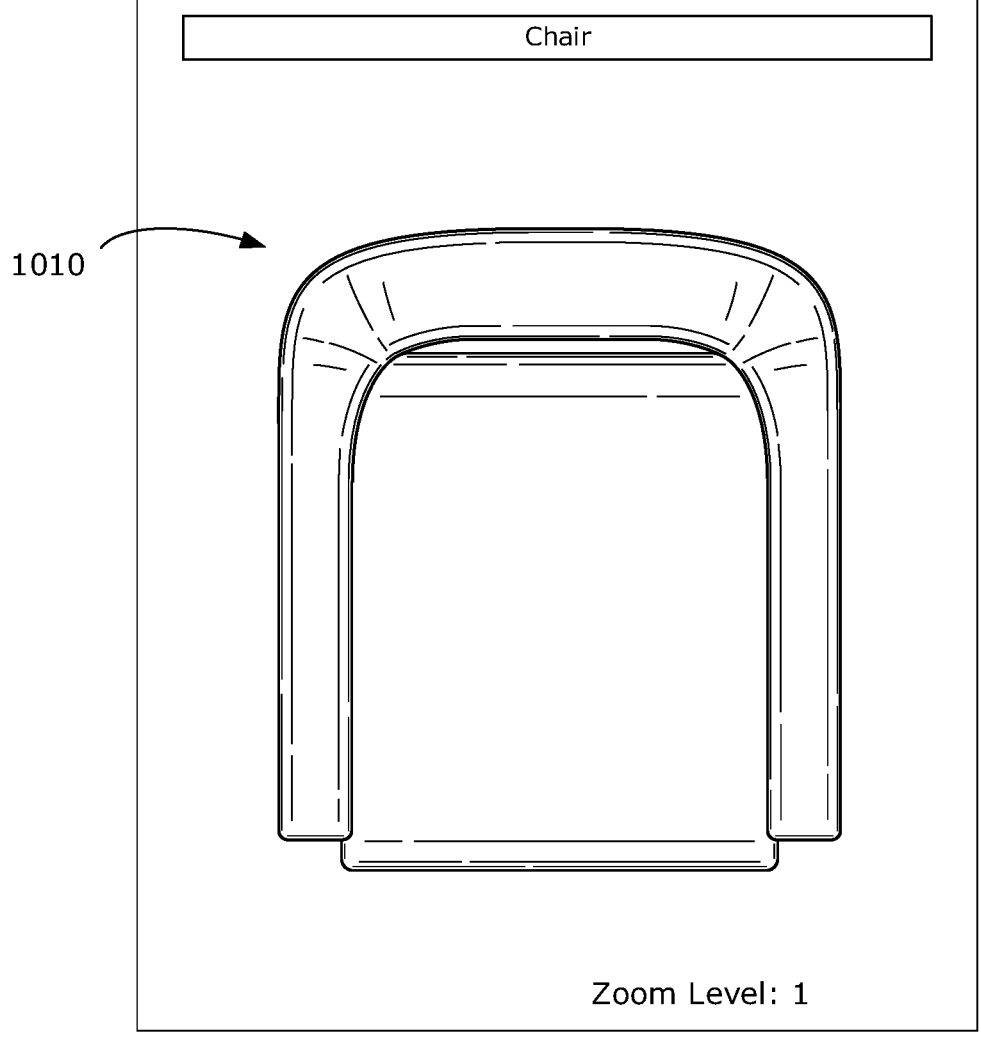
FIGS. 10A, 10B and 10C each shows another example 2D view rendered by the 3D model in FIG. 7.
Figure 10B:
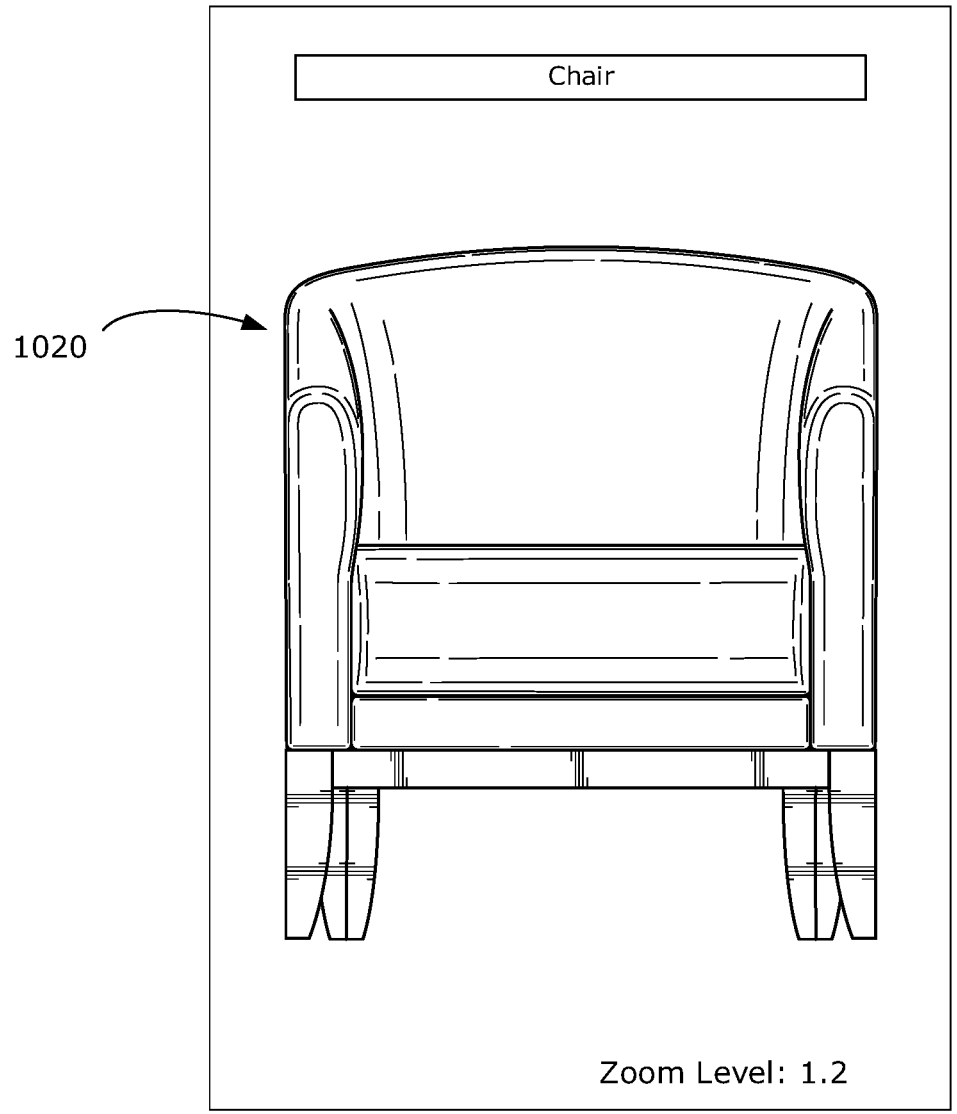
Figure 10C:
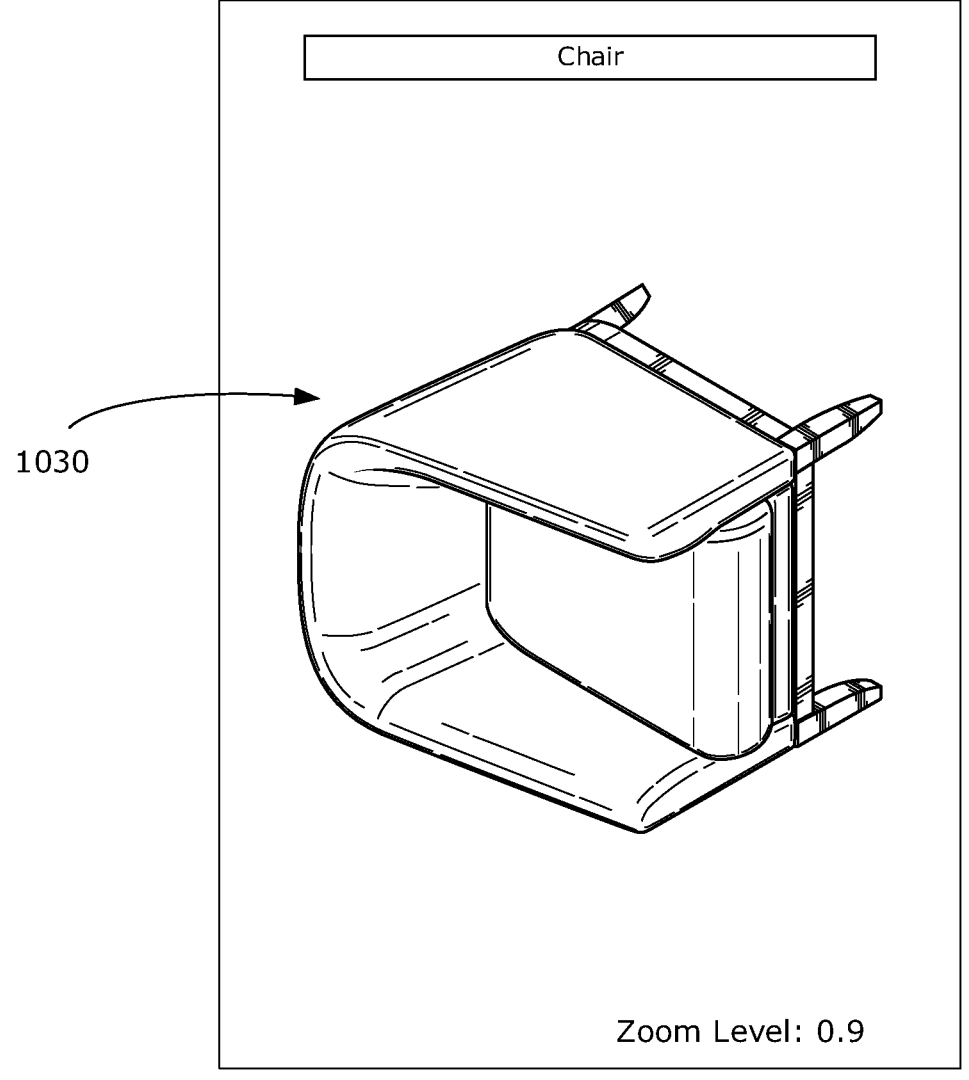

For example, FIG. 10A shows an example 2D view 1010 that may be rendered by the electronic device 150 based on a view of the 3D model 710 at a certain viewpoint and zoom level (in this case, a default of zoom level 1); FIG. 10B shows another example 2D view 1020 that may be rendered by the electronic device 150 based on a view of the 3D model 710 at another viewpoint and zoom level (in this case, zoom level 1.2); and FIG. 10C shows another example 2D view 1030 that may be rendered by the electronic device 150 based on a view of the 3D model 710 at yet a different viewpoint and zoom level (in this case, zoom level 0.9).

As described above, a customer may, while viewing the 3D model 720 of the product on the electronic device 150, manipulate the 3D model 720 to view the product at various perspectives (e.g., top, bottom, left, right, front, or back), at various viewing angles, at various viewpoints, or zoom in and out at different levels. In some embodiments, the customer may manipulate the 3D model 720 through touchscreen motions and gestures if the electronic device 150 is touchscreen enabled. For example, on an iPhone™ OS, in order to change a current viewpoint for viewing the 3D model to a different viewpoint, the customer can:

1) double tap on the screen to zoom in or out of the 3D model view, thereby changing the zoom level;

2) put one or two finger(s) on the screen and drag it in the desired direction to rotate or pan the 3D model, thereby changing the viewpoint and/or viewing angle; or 3) use a two-finger (e.g., thumb and index finger) gesture to zoom in or out of the 3D model view by pinching the view in or out, thereby changing the zoom level.

Other user gestures and maneuvers may be used to view and control the 3D model, depending on the operational system of the electronic device 150 and touch screen settings. In some cases, the customer's electronic device 150 may be on a desktop computer, in which case a mouse and/or keyboard (or other input devices) may be used to manipulate the 3D model. In some other cases, the customer may send voice commands, through a speech recognition and processing software, to the electronic device 150 for manipulating the 3D model. In yet other cases, the customer may send commands through a hand gesture or other body movement, through a body movement processing software, to the electronic device 150 for manipulating the 3D model. Regardless of the input means used by the customer to view and control the 3D model, the electronic device 150 can determine and store all the viewing parameters and their specific values associated with each viewing event of the 3D model. A viewing event may be defined as an event during which the customer has viewed the 3D model with a selected value for a given viewing parameter (e.g., from a specific viewpoint) for a period of a minimum threshold dwell time, while the value of the given viewing parameter remain unchanged. In some examples, the values of all viewing parameters should remain unchanged for the minimum threshold dwell time, in order for those values to be selected for a viewing event. In other examples, only a subset of the viewing parameters may need to be unchanged, in order for that subset of values to be selected for a viewing event. For example, even if the color, lighting and texture of the 3D model is changed, if the viewing angle and zoom level remain unchanged for the minimum threshold dwell time, the specific viewing angle and zoom level may be considered to be selected values for a viewing event, and the associated viewing angle and zoom level may be stored. The minimum threshold dwell time may be set to a default value (e.g., 3 or 5 seconds), and may be changed from time to time by the e-commerce platform 100, for example, the minimum length of time for defining a viewing event may be adjusted by a machine learning engine that is configured to determine the most desired 2D views based on how a 3D model is viewed and manipulated by a large number of customers on the e-commerce platform 100. A viewing event may be defined in other ways, in addition to a dwell time. For example, a viewing event may be a customer selecting an option to save or share a particular view of the 3D model.

As a customer browses a product listing by an online store and manipulates the 3D model (e.g., presented on the browser or through a mobile application), the electronic device 150 may send to the e-commerce platform 100 one or more values for the viewing parameters associated with each manipulation of the 3D model for one or more viewing events. In addition, the e-commerce platform 100 may provide an option (e.g., through a browser or a mobile application), for the customer to change a visual property of the 3D model or a part of the 3D model. For example, the customer may change a color, a texture, a lighting and/or a background color of a 3D model, or part thereof. Each time a visual property is changed, a corresponding viewing parameter has an updated value. If that updated value corresponds to a viewing event (e.g., the 3D model is viewed with a selected color for longer than the threshold dwell time), the value for that viewing parameter may be sent by the electronic device 150 to the e-commerce platform 100.

In some embodiments, a 3D model may have one or more parts that are animated. For example, a merchant product may be a chair with a movable (e.g. revolving or swiveling) seat, and a corresponding 3D model of the chair may include an animated seat portion shown to be swiveling. In these cases, for a 3D model with an animated part, the electronic device 150 may send to the e-commerce platform 100 one or more values for the viewing parameters associated with each manipulation of the animation within the 3D model for one or more viewing events. For example, the electronic device 150 may capture at what zoom level and/or viewpoint position a user of the electronic device 150 chooses to pause the animation. For another example, the electronic device 150 may capture a duration of the pause when a user of the electronic device 150 pauses the animation. The duration of pause may be used to define a dwell time which can be used to further determine a viewing event. In yet another example, the electronic device 150 may record a playback point in the animation of the 3D model at which the user has paused the animation, as well as the various viewing parameters associated with the 3D model at this playback point, such as a specific zoom level, a specific viewpoint, a specific still image of the animated part of the 3D model, and the total number of times the user has paused the animation at this playback point. All of these captured values for one or more viewing parameters may be sent by the electronic device 150 to the e-commerce platform 100.

In some embodiments, the e-commerce platform 100 may provide an augmented reality (AR) application, such as an AR processor 346, for permitting customers to view various products as virtual objects in a customer environment. In particular, the e-commerce platform 100 may provide an option to users to interact with an augmented reality application, which allows customer users or merchant users to select a desired item for view as a virtual object in one or more images that are user-supplied. For example, a customer may project a 3D model 710 to a live view presented on the electronic device 150 by using a camera of the electronic device 150. The customer electronic device 150 may be any suitable device capable of augmented reality displays, and may be a dedicated augmented reality device or may be a general purpose device. The electronic device 150 may be a smart phone, a tablet, or a specialty device such as "smart glasses" by Microsoft HoloLens™, among other possibilities. If the electronic device 150 is a smart phone or a tablet with a touchscreen, a user may also view and manipulate the 3D model 710 in ways similar to those described above, on a smart phone or tablet device without AR capabilities, and the viewing parameters may be similarly captured and stored.

For another example, a customer interested in a merchant product may be enabled to upload or share one or more images of the customer's environment, where, here and throughout the disclosure, the one or more images may be a single image, a set of separate images, or a set of video images. The one or more images may be recorded, uploaded from storage, or captured and shared in real time. As an example, a merchant product may be a vase. A customer interested in the vase may share one or more images of a set of shelves in the customer's living room, using the camera on the customer's mobile computing device to capture one or more images of the set of shelves, or to capture a video of the shelves from various viewpoints, wherein the video may be streamed in real time. The augmented reality application (e.g., provided by the AR processor 346) may operate to augment the customer supplied one or more images with a virtual object (generated from a stored 3D model) of the vase, such that an augmented one or more images may be created depicting the 3D model of the vase on one of the shelves. The augmented one or more images can be created and then displayed on the customer computing device (via a web browser or application interface or the like). The customer or the merchant, via their respective computing devices, may be able to provide control signals, such as touch screen inputs, mouse positioning, or the like, to position or reposition the 3D model of the vase, such as via a drag and drop action or other known manipulations. For example, the vase could be initially dragged and dropped at a position on a selected shelf, then repositioned and/or reoriented on the same or a different shelf or on another surface.

In yet another example, a customer interested in a merchant product, such as a refrigerator, may be enabled to upload or share (possibly in real time) one or more images of the customer's kitchen, and the augmented reality application may operate to provide the customer with a 3D model of a virtual refrigerator in place of an existing refrigerator or in a space provided for a refrigerator. The augmented one or more images can be displayed on the customer computing device and on a computing device of the merchant. The customer or the merchant, via their respective computing devices, may be able to provide control signals, such as touch screen inputs or the like, to manipulate and move the 3D model of the virtual refrigerator or various components of the virtual refrigerator, such as to insure that there are no impediments to the refrigerator being moved into the desired space, or to illustrate various features of the refrigerator by opening and closing various doors or drawers of the refrigerator.

With such an augmented reality application, the customer may exercise control over what portion of the environment to provide as background for the 3D model and may exercise control over a desired position/orientation of the 3D model. The augmented reality application may provide customers new ways to evaluate and interact with various merchant products and may also provide merchants the ability to showcase various features of these products and inspire desire for these products, in part by demonstrating suitability of a product for a particular customer location.

Computing and communication components for the AR processor 346 can exist at various locations such as at a customer device 150, at a merchant device 102, a separate server, and/or at the e-commerce platform 100, and the AR processor 346 may exist as part of, or outside of, e-commerce platform 100. The AR processor 346 may include multiple application components that may be duplicated in various locations. Application components may include an interface module enabled to receive one or more customer images from a customer computing device, wherein the one or more customer images each depicts a customer environment, receive a selection of a merchant item for display, receive a positioning or repositioning signal corresponding to a desired location of virtual object in the customer environment. Application components may include a computing module comprising a processing engine and storage to execute processing related to determining 3D feature points and 3D feature data by evaluating one or more customer supplied images and other data, retrieving, creating, and resizing a virtual object corresponding to a selected item (such as a merchant product), creating an augmented image, set of images, or video such as by overlaying the virtual object at a selected or determined location in one or more customer supplied images (which may be provided from storage or in real time, for example as a real time video stream), and moving, repositioning, orienting, reorienting, sizing, or resizing the virtual object, or component parts of the virtual object, in one or more images of the customer-supplied images. In some embodiments, 3D feature data may include one or more of camera position, camera orientation (including, without limitation, rotation, angle, roll, gamma, yaw, alpha, pitch, beta and the like), position of any detected surfaces, objects or features, the size and orientation of those surfaces, objects or features, planes, AR-related metadata and the like.

In some embodiments, 3D feature data may be associated with an image or series of images, for example captured at a rate equal to the frame rate of a video (such as 60 frames per second). In some embodiments, the augmented reality of one or more images with the virtual object depicting a selected merchant product can be displayed on both a customer computing device and a merchant computing device (as well as other computing devices), and both customer and merchant (as well as others) can be enabled to control the movement, sizing, and orientation of the virtual object in the customer-supplied one or more images. In this way, a 3D model of the customer environment is not necessary, and those portions of a customer environment are provided as desired by a customer, such as via a camera on a customer computing device capturing one or more images of a potential site for a merchant product. In some embodiments, a peer to peer type architecture can be used. In embodiments, screen mirroring can be used, such that a display at the customer computing device or other computing device is mirrored in the merchant computing device or another computing device.

In some embodiments, a customer may view the 3D model through a virtual reality (VR) interface provided by the VR processor 344. For example, the electronic device 150 may be a VR headset worn by the customer, such as the Oculus Rift™ headset, or the electronic device 150 may be a general purpose device (e.g., a smartphone or tablet) that may be modified (e.g., using attachments) for VR applications. The VR headset may completely take over the customer's vision and present a virtual space provided by the e-commerce platform 100 (e.g., via the VR processor 344). For example, when wearing a VR headset, the customer may be surrounded by a virtual merchant store with multiple products for sale. The customer may select one product with a voice command or a hand gesture, and a 3D model of the selected product may be displayed in front of the customer within the boundaries of the virtual space. In some embodiments, the VR headset may be wirelessly connected to the e-commerce platform 100, and the virtual space may be provided by the e-commerce platform 100. A customer may walk around the 3D model to view the product, and may manipulate the 3D model by a voice command (e.g., "show me the top side of the chair"), by gestures (e.g., using a sweeping gesture to rotate a 3D model), by input mechanisms (e.g., using buttons or a joystick), or other suitable means.

The 3D model is overlaid on top of a 3D coordinate system that may be invisible to the customer, with the center of the 3D model overlapping with the origin (0, 0, 0) of the coordinate system. Since the VR headset is typically worn around a user's eye level, the position of the VR headset (e.g., center of the VR headset) can be taken to be or approximate the position of the viewpoint at any given time when a customer wearing the VR headset is looking at the 3D model. Since the position of the VR headset is continuously known and updated in real time, the viewpoint position in the form of 3D coordinate $(x_t, y_t, z_t)$ is also known and updated in real time or near real time. As the customer physically walks around the 3D model, the VR headset may detect the customer's physical motions, and send real-time data representing the physical motions to the VR processor 344 of the e-commerce platform 100. The VR processor 344 may use the data representing the physical motions to calculate a virtual physical distance of the customer wearing the VR device relative to the center of the 3D model at the origin (0, 0, 0). This virtual physical distance may be used to determine a zoom level for generating the appropriate view of the 3D model in real time. For example, if the customer walks 3 steps backward, the 3D model may be zoomed out to appear 20% smaller. For another example, if the user bends his or head down to look at the product (or at a detail of the product), the VR processor 344 may update the appropriate viewing parameters, such as a position of the viewpoint, a zoom level, an image size, and a visual property change (if any). In the VR environment, a viewing event may be defined based on a threshold dwell time, similar to that in a non-VR environment as described above.

A 2D image generator 342 of the e-commerce platform 100 (see FIG. 6) may be configured to generate one or more 2D images based on a given 3D model 710, and specifically, based on how the 3D model 710 has been viewed and/or manipulated by one or more customers interacting with the 3D model 710, in accordance with one or more exemplary methods described below.

As illustrated in FIG. 11, an exemplary method 1100 as performed by the e-commerce platform 100 (e.g., using the 2D image generator 342, the VR processor 344 and/or AR processor 346, as appropriate) for generating a recommendation for a desired 2D view based on a 3D model may include the following steps. In some embodiments, the e-commerce platform 100 may be configured to provide functionality via a graphical user interface (GUI) for customers to interact with a 3D model 710. For example, a customer may, when browsing a merchant online store 138 on an electronic device 150, select a product image or icon indicating a 3D model associated with a particular merchant offering by clicking or tapping on the image or icon. At step 1101, which may be optional, the user selection may be processed by the e-commerce platform 100 as a user request for viewing a 3D model associated with the merchant offering (e.g., a merchant product).

In some embodiments, if and when the customer is browsing the merchant online store 138 via a mobile application, the mobile application may be configured to receive a set of device parameters from the electronic device 150 necessary for rendering a 3D model. Similarly, if and when the customer is browsing the merchant online store 138 via a web browser, the web browser may be configured to receive a set of parameters from the electronic device 150 necessary for rendering a 3D model. The set of device parameters may be sent as part of the user selection to the e-commerce platform 100 as a user request for viewing the 3D model. The set of device parameters may include, for example, a version of the web browser, availability and version of appropriate 3D model viewing application, software or plugin (e.g. Flash™), RAM size, pixel size of the display screen (which can be obtained by dividing the length and width of the display screen by a total number of pixels), model and version of operation system (OS) of the electronic device 150, input means (e.g. touchscreen, touchpad, mouse) and so on.

At step 1102, the e-commerce platform 100 may send the 3D model data (e.g., in the form of a point cloud or any suitable type of 3D model data) associated with the selected product to the first electronic device 150. In some embodiments, the 3D model data may be selected to fit the set of device parameters optionally sent to the e-commerce platform 100 in step 1101. For example, the stored 3D model corresponding to the selected merchant offering may be referenced from the 3D model database 330, and the 3D model data may be generated from the stored 3D model. The 3D model may be in stored a conventional 3D model format in the 3D model database 330. After the electronic device 150 receives the 3D model data, a virtual object corresponding to the 3D model data of the merchant product may be retrieved or generated in known ways. The virtual object may be resized to fit the screen size of the electronic device 150 prior to being displayed on the screen.

In some embodiments, instead of the electronic device 150, the e-commerce platform 100 may also generate a virtual object corresponding to the 3D model data of the merchant product in known ways. In this case, the e-commerce platform 100 may send the generated virtual object directly to the electronic device 150, via a web browser configured with JavaScript™, for example.

As mentioned, step 1101 may be optional. Where a user request for a 3D model associated with the merchant offering is not received by the e-commerce platform 100, the platform 100 may nevertheless send 3D model data associated with the merchant product to the first electronic device based on a triggering event. The triggering event may be, for example, clicking of a web link for a merchant offering shown in a storefront 139 by an electronic device 150; in this case, explicit user request is not necessary for the e-commerce platform 100 to send the 3D model associated with the merchant offering being selected for browsing.

At step 1104, the e-commerce platform 100 may receive, from the first electronic device 150, data representing a selected value for one or more viewing parameters of the stored 3D model. For example, the e-commerce platform 100 may receive data representing values corresponding to one or more viewing parameters of the 3D model captured in a single viewing event, such as values for a viewpoint position, a zoom level, an image size, a viewing angle, an orientation, a distance from the origin of the 3D model, a size of the virtual object generated based on the 3D model data, a color, a texture, a level of detail, a lighting, boundaries for a color, boundaries for a texture, and boundaries for a lighting. Other possibilities may exist. For instance, the values may include a zoom level of 1.5, an image size of 1000×1000 pixels, a viewpoint V at position coordinate $(x_v,$ $y_v, z_v)$, a viewing angle of (45°, 60°) i.e., 45 degrees from X axis and 60 degrees from XY plane, an orientation of top view, a virtual object size of 500×500 pixels, and/or a distance of 100 (units) from the origin as measured between the origin and the viewpoint. Values for certain viewing parameters may be determined based on the values of one or more other viewing parameters. For example, a viewpoint position may determine one or more viewing angles and an orientation. An image size may indirectly determine a size of the virtual object being displayed in the image size. A viewpoint position may also determine a zoom level. A zoom level may in turn determine a displayed level of detail of the 3D model. In some cases, there may exist a maximum level of detail for a 3D model, and if a 3D model in a viewing event is zoomed beyond this maximum level of detail, the corresponding 2D view cannot show the texture of the merchant product properly. Therefore, in some embodiments, in a viewing event, a zoom level may be limited by a maximum level of detail.

In some embodiments, the electronic device 150 may send every updated value for every viewing parameter to the e-commerce platform 100 regardless of whether there has been a viewing event. In such cases, the e-commerce platform 100 may determine, based on the period of time for which a value for a viewing parameter is unchanged, whether that value corresponds to a viewing event. Viewing parameter values that correspond to a viewing event may be used to identify a desired 2D view of the 3D model. As discussed above, in some embodiments, one or more values for the viewing parameter(s) may be considered to be selected values if the customer has spent a minimum amount of time (e.g., threshold dwell time) viewing the 3D model without changing or modifying any of the viewing parameters. In other embodiments, one or more values for viewing parameter(s) may be considered to be selected values if the customer has spent a minimum amount of time (e.g., threshold dwell time) viewing the 3D model without changing or modifying the value for the at least one viewing parameter, such as the viewpoint position. A machine learning engine may be configured to learn an optimal data selection criteria for sending data representing selected values for one or more viewing parameters for a 3D model.

In some embodiments, the 3D model may be viewed and manipulated in a VR or AR environment, as described above in detail. The e-commerce platform 100 may include or be interfaced with the VR or AR environment in order to capture the viewing events, as well as some or all of the values for some or all of the viewing parameters within the VR or AR environment. For example, if a customer wearing a VR headset visits a virtual merchant store and views a virtual object of a chair generated from a stored 3D model, the customer's physical motions including eye, head and arm movements may be captured by the VR headset and transmitted to the e-commerce platform 100 in order to generate corresponding values for one or more viewing parameters during one or more viewing events with respect to the virtual object. For another example, in an augmented reality environment, as a customer is observing or manipulating a virtual object overlaid with a real world environment captured by a camera of the electronic device 150, the electronic device 150 may be configured to detect and transmit some or all of the values for some or all of the viewing parameters during one or more viewing events.

At step 1106, in some embodiments, the e-commerce platform 100 may determine, from the received data, a desired 2D view of the stored 3D model. For example, a desired 2D view of the stored 3D model may be the 2D view determined based on the selected value(s) for the one or more viewing parameters in a single viewing event from a first electronic device 150. In other cases, the desired 2D view of the stored 3D model may be determined based on a set of selected values for one or more viewing parameters collected from multiple viewing events across one or more electronic devices 150. The multiple viewing events may be performed by a single customer or by multiple customers.

For example, the received data may represent a plurality of selected values for at least one viewing parameter of the stored 3D model received from a respective plurality of customer electronic devices including the first electronic device 150. The desired 2D view of the stored 3D model may then be determined from the received data, for example based on a statistical analysis of the plurality of selected values for the viewing parameter. The statistical analysis may be carried by the e-commerce platform 100 (e.g., using the 2D image generator 342, or by a machine learning engine in cooperation with the 2D image generator 342). In some embodiments, the machine learning engine may be part of the 2D image generator 342.

In an example embodiment, the 2D image generator 342 is configured to analyze a group of data representing multiple values for a viewing parameter (or simply "parameter(s)"), such as the viewpoint parameter, and generate an optimal value for the viewing parameter for the desired 2D view of the stored 3D model. An example value for a viewpoint parameter may be expressed as a position coordinate in a 3D coordinate system, for instance, [100, 150, 200]. Multiple viewpoint values may be collected over multiple viewing events, and a statistical average may be taken among the multiple viewpoint values to generate an optimal value in the form of $[X_D, Y_D, Z_D]$ for the viewpoint parameter. It can be appreciated that a viewpoint position coordinate $[X_D, Y_D, Z_D]$ may be used to determine values for additional viewing parameters, such as viewing angles (e.g. 56 degrees from X axis and 90 degrees from ZY plane), zoom level, and orientation.

In some embodiments, the 2D image generator 342 may generate the optimal value(s) for the viewing parameter for the desired 2D view of the stored 3D model based on a weighted average approach. For example, each selected value for a given viewing parameter may be assigned a weight that is proportional to the dwell time for that selected value.

In some embodiments, instead of using an average or a weighted average value based on the multiple values for the viewpoint parameter, a single viewpoint value $[X_S, Y_S, Z_S]$ may be selected if it is the most commonly chosen viewpoint (e.g., a majority value) among all the viewing events from the plurality of customer electronic devices.

A 3D model may be displayed in one of many common visual orientations. A visual orientation may be determined based on a specific viewing angle and a specific zoom level, which can in turn be determined by a specific viewpoint value $[X_S, Y_S, Z_S]$. Therefore, a visual orientation is a property of a viewpoint. A common visual orientation is defined as one of the most commonly displayed orientation for a product. For example, a common visual orientation can be a perspective view, front view, a top view, a back view, a left side view, a right side view, or a bottom view. In some embodiments, the 2D image generator 342 may generate the optimal value(s) for the viewing parameter for the desired 2D view of the stored 3D model based on a common visual orientation, e.g. a front view, if the specific common visual orientation is the most commonly chosen orientation based on a weighted average approach, or another appropriate method.

Other techniques for determining the optimal value of a viewing parameter may be used, including non-statistical techniques.

In some embodiments, an optimal value of a viewpoint for generating the desired 2D view of a 3D model may be associated with a product type of the virtual object rendered by the 3D model data. For example, if the virtual object is a chair, a common viewpoint chosen by potential customers may be a perspective view that shows at least three sides (e.g. top, left and front) of the chair placed on an even surface. Such properties may be taken into consideration by the 2D image generator 342 in order to eliminate outlier data from the plurality of customer electronic devices.

Another viewing parameter that may be used to generate the desired 2D view is a visual property of part of all of a virtual object generated based on the 3D model, such as a color, a texture, a pattern, or a lighting. A plurality of customer electronic devices 150 may send data indicating that yellow or a texture of wool or cross patterns is most often selected by the customers when looking at a virtual object (e.g. a dress) rendered by the stored 3D model. These selected data may be stored for each visual property, and may be used to generate the most desirable 2D image of the stored 3D model.

In some embodiments, in order to generate determined the desired 2D view for a merchant product, the e-commerce platform 100 may be configured to track and associate at least one customer attribute with one or more value(s) for one or more viewing parameters of the 3D model.

For example, the received data at step 1104 above may be associated with a customer profile or a customer attribute. This customer information may be used to identify a cohort to which the customer belongs (e.g., a demographic group, a geographical group, an age group, a gender group, etc.).

In some examples, using such information about customer attributes, the desired 2D view may be determined for a specific cohort of customers. The received data may be sorted based on different cohorts based on associated customer attributes and the desired 2D view may be determined for each cohort, in addition to or instead of determining the desired 2D view across all customers. Such cohort or attribute-specific information may be useful in order to better tailor the 2D view to the customer.

In some embodiments, a 2D image that is eventually generated based on a particular desired 2D view may be stored with metadata indicating one or more cohorts identified based on the information from a customer profile or attribute associated with the received data at step 1104. For example, a 2D image generated based on a desired 2D view may be stored with the metadata that the 2D image is for customers belonging to the cohort group "female", "20-30 years old", "living in urban area", or a combination of any two or more of the listed cohort groups. A 3D model of a merchant product may therefore have multiple 2D images generated and stored, with at least some of the 2D images earmarked for one or more cohort groups, by way of metadata.

In some examples, the e-commerce platform 100 may associate a customer's action with one or more selected value(s) for one or more viewing parameters. The customer's action can be considered to be positive such as saving the product listing, adding the product listing to a "favorites" list, sharing a link to the product listing, adding the product to a virtual shopping cart or making a purchase of the product (among other possibilities), or negative such as leaving the product listing page, leaving the online store, removing the product from a virtual shopping card, abandoning the virtual shopping cart, and so on. The association may generate data labels or weights for each value for the one or more viewing parameters for the 3D model, the data labels or weights indicating if a particular value may lead to more (or less) views, more (or less) sales, and more (or less) abandoned sales. These data labels or weights may be used (e.g., using statistical methods or machine learning techniques) to determine, from the selected values for one or more viewing parameters of the 3D model, a desirable 2D view for a merchant product. In some examples, instead of associating data labels or weights to each selected viewing parameter value, values that are associated with negative customer actions may be simply discarded from consideration.

In some embodiments, the determination of a desired 2D view based on the received data from the electronic device(s) 150 includes the determination and storage of one or more optimal values for one or more viewing parameters for the desired 2D view, as described above, and might not necessarily include the generation of the 2D image based on the one or more optimal values for the one or more viewing parameters.

At step 1108, the e-commerce platform 100 may generate a recommendation, for a second electronic device (e.g., a merchant electronic device 102), to include the desired 2D view in a stored listing. The stored listing may be a listing, stored at the e-commerce platform 100, that is associated with the merchant product and/or the online store. More generally, for a merchant product that is available via an online store, a stored listing of the merchant product is considered to also be a listing associated with the online store. The stored listing may be a listing that is part of a store profile, which may be included in search results generated by a search engine, for example. It should be understood that the stored listing may be stored in the e-commerce platform 100, or may be stored outside of the e-commerce platform 100. For example, the stored listing may be stored locally on the merchant device 102, or in a third-party server.

For example, the recommendation may include the determined one or more optimal values for one or more viewing parameters for the desired 2D view. The recommendation may further include information indicating that a desired 2D view of a merchant product was determined based on data collected during a certain period, based on data collected from a particular customer cohort, based on positive customer actions, or combinations thereof. Such information may indicate to a merchant that including the desired 2D view in the listing would likely result in more customer views, sales, or other positive outcome.

As previously described, a default 2D image that is shown in a listing for a merchant product may be important in at least encouraging a customer to place and pay for an order of the product. A 2D image generated based on a desired 2D view of a merchant product may yield greater foot traffic to the online store if it is the "default image" that comes up as a search result in a search engine query. The same 2D image may also cause a customer to spend more time viewing the product, to place the product in a virtual shopping cart, and/or to make a payment for the product and complete the transaction. The recommendation is therefore of value to a merchant online store and can be sent to a merchant device in real time or near real time.

In some embodiments, the recommendation may include an option to update the stored listing with the 2D image generated (e.g., by the 2D image generator 342) based on the desired 2D view of the 3D model of the merchant product. This may be done regardless of whether the merchant online store 138 already has a 2D image or a default 2D image of the merchant product in the stored product listing. In some embodiments, the e-commerce platform 100 may generate the recommendation after determining that the desired 2D view is absent in a stored listing for the merchant product. In this case, the recommendation may include a message indicating that the current merchant product does not have a 2D image corresponding to the desired 2D view, and an update of the stored listing may be recommended.

In some embodiments, the e-commerce platform 100 may generate a recommendation including multiple desired 2D views for a merchant product in a stored listing. As mentioned above, a 3D model may lead to multiple desired 2D views, and optionally, multiple generated 2D images, based on different cohort group characteristics. For example, based on a customer profile and/or customer information received while a customer was browsing the merchant product in an online store, the e-commerce platform 100 may recommend a specific desired 2D view and/or its corresponding 2D image to be displayed to the customer browsing the merchant product. In some cases, the e-commerce platform 100 may generate a single recommendation including different sub-recommendations for different customers browsing the online store, with each sub-recommendation including a specific desired 2D view, or linking to a specific stored 2D image for the merchant product, based on one or more cohort group(s) for the target customer. The recommendation may be generated in response to gathered data regarding one or more customers that have browsed the merchant product online.

In some embodiments, the e-commerce platform 100 may generate multiple recommendations, each recommendation including a specific desired 2D views for a merchant product in a stored listing based on a specific cohort group characteristic of a customer. For example, each recommendation can include a specific desired 2D view, or linking to a specific stored 2D image for the merchant product, based on a specific cohort group for the target customer (e.g. "female" or "20-30 years old"). Each recommendation may be generated in response to gathered data regarding one or more customers that have browsed the merchant product online.

In some embodiments, the 2D image generator 342 generates the 2D image based on a desired 2D view, i.e., based on the one or more optimal values for the one or more viewing parameters. Once a 2D image corresponding to the desired 2D view is generated, it may be stored in 2D image database 320, and a reference (e.g., a memory address) for the desired 2D view may be stored in a data entry 315 in the product database 310 for the corresponding merchant product. The 2D image may be stored in an appropriate format, such as JPG, PNG, or WEBP. In some embodiments, a 2D image based on a desired 2D view may be generated and stored in more than one formats, and each stored 2D image has a unique reference (e.g. a memory address) in the 2D image database 320. The unique reference may be stored in a data entry 315 in the product database 310 for the corresponding merchant product. The stored 2D image may be retrieved any time by the e-commerce platform 100 for displaying the merchant product.

In some embodiments, step 1108 may be optional, in which case the 2D image generator 342 generates the 2D image based on the desired 2D view without generating a recommendation for the desired 2D view. For example, the e-commerce platform 100 may be configured to automatically generate and store one or more corresponding 2D images for one or more merchant products based on the desired 2D view, without having to generate a recommendation for a second electronic device (e.g., a merchant electronic device 102). This may be pre-configured by a merchant while he or she sets up the stored listing for the merchant product, or for all stored listings in an online store generally. Once a 2D image corresponding to the desired 2D view is generated, it may be stored in 2D image database 320, and a reference (e.g., a memory address) for the desired 2D view may be stored in a data entry 315 in the product database 310 for the corresponding merchant product. In some embodiments, the e-commerce platform 100 may be configured to automatically upload a generated 2D image for a merchant product in a stored listing of the merchant product either in real-time or via batch processing. This way, the e-commerce platform 100 does not need to wait for any command signal from a merchant device in order to generate, store or update the stored listing of a merchant product with an appropriate 2D image based on the desired 2D view. This feature may be turned on or off by a system administrator or a merchant in store settings.

In some embodiments, the e-commerce platform 100 may generate and store multiple 2D images from the same 3D model based on a desired 2D view for a merchant product in a stored listing, either automatically or after having received a command signal from a merchant device. For example, a merchant product may be available in a variety of colours or a variety of material types, while belonging to the same product category. The e-commerce platform 100 can be configured to recognize that a desired 2D view for one product in the product category is applicable to the other products in the same category (e.g. with the same 3D model), and proceed to generate multiple 2D images, each being a corresponding 2D image for a particular product in the same product category. Each generated 2D image may be stored in the 2D image database 320, and a unique reference (e.g., a memory address) for the 2D image may be stored in a data entry 315 in the product database 310 for the corresponding merchant product, while each corresponding merchant product may be associated with a unique product ID or SKU. In some cases, a group of multiple 2D images stored in the 2D image database 320 may be associated with a particular product category.

The e-commerce platform 100 can, as an optional step, then compare between the generated 2D image and a current 2D image included in the stored listing for the merchant product (in embodiments where the stored listing is stored at the e-commerce platform 100, for example, or where the merchant has submitted a listing for comparison) to determine that the desired 2D view is absent in the listing, and send a recommendation to the merchant electronic device 102 with a message that the desired 2D view is absent in the stored listing for the merchant product. Machine vision techniques, such as image recognition, may be implemented as part of e-commerce platform 100 to compare the 2D image based on the desired 2D view against one or more 2D images already in the stored listing.

After the merchant device 102 has received the recommendation, the merchant device 102 may receive a user command from the merchant to update a 2D image, such as a default 2D image, of a merchant product in a stored listing on the merchant store based on the recommendation. In some embodiments, after the e-commerce platform 100 receives the user command from the merchant device 102, the e-commerce platform 100 may update the default 2D image of the merchant product associated with the stored listing automatically. In some embodiments, the e-commerce platform 100 is configured to provide a user interface for the merchant to generate, review and update the 2D image of a merchant product based on the recommendation.

After the stored listing for the merchant product has been updated with the 2D image generated based on the desired 2D view, the e-commerce platform 100 may cause the first electronic device 150 to display the updated 2D image as a default 2D image when a customer browses the stored listing using the electronic device 150.

Although the method 1100 has been illustrated and discussed as a continuous sequence of steps, in some examples the steps 1101-1104 and the steps 1106-1108 may take place at separate times, and need not immediately follow in time. For example, the e-commerce platform 100 may send 3D model data to and receive viewing data from a plurality of customer devices over a period of time. The received data may be analyzed at a future time (e.g., at regular intervals, or when a minimum amount of viewing data has been received) to determine the desired 2D view and generate the recommendation. In some examples, the desired 2D view may be determined and stored. The recommendation of the desired 2D view may be generated at some future time, for example after receiving a request from a merchant device. Further, in some examples, the steps 1106-1108 may be performed repeatedly for the same set of received viewing data, but tailored to different customer attributes. This may enable the same set of viewing data to be analyzed to generate different recommended 2D views to target different customer cohorts, for example.

FIG. 12 is a flow chart of an example method 1200 performed by the e-commerce platform 100 to generate a recommendation for a 2D view of a second 3D model based on how a first 3D model was viewed by a customer. A desired 2D view may be determined from how the first 3D model was viewed, and the desired 2D view may be recommended for a second 3D model, based on a relevancy between the first and second 3D models. For example, the first and second 3D models may be relevant to each other because they are both associated with the same merchant product. In another example, the first and second 3D models may be relevant to each other because they are associated with different products that belong to the same product category. For example, a desired 2D view that has been determined for a specific chair may be used to generate recommendations to include a similar 2D view in listings for other chairs.

At step 1202, the e-commerce platform 100 sends 3D model data associated with the merchant product to a first electronic device 150, the 3D model data being generated from a first 3D model of the merchant product. At step 1204, the e-commerce platform 100 receives, from the first electronic device 150, data representing a selected value for at least one viewing parameter of the first 3D model of the merchant product. Steps 1202-1204 may be similar to steps 1102-1104 described above.

Optionally, at step 1206, the e-commerce platform 100 may receive a second 3D model. The second 3D model may be another 3D model of the same merchant product as the first 3D model, the second 3D model for example may be generated based on different visual properties or an updated product material. The second 3D model may be, for example, associated with a variant of the same merchant offering as the first 3D model. Alternatively, the second 3D model may be for a different merchant product, whether from the same merchant or a different merchant.

At step 1208, the e-commerce platform 100 determines, from the received data representing the selected value for the viewing parameter of the first 3D model of the merchant product, a desired 2D view of the second 3D model of the merchant offering, recognizing that the first 3D model is relevant to the second 3D model (e.g., the first and second 3D models are of the same merchant offering or the same type of merchant offering). For example, both 3D models may be referenced by the same merchant offering in the product database 310, or the merchant offerings, while being different products, are referenced to each respective 3D model may belong to the same product category.

In some embodiments, the first stored 3D model may be determined to be relevant to the second stored 3D model on the basis of the first and second stored 3D models being associated with the same merchant offering. For example, a merchant offering may be stored in a data entry in the product database 310, the data entry may include a reference for the first 3D model and a reference for the second 3D model. The reference may be, for example, a respective memory address for the first or second 3D model. In this case, the first 3D model is recognized to be relevant to the second 3D model and vice versa. For another example, each of the first and second 3D models may be stored separately in respective data entry in the 3D database 330. Each respective data entry in the 3D database 330 may include a product field which contains a value (e.g., a reference or memory address) representing a merchant offering. If the value in the product field in the data entry in the 3D database for the first 3D model is the same as the value in the product field in the data entry in the 3D database for the second 3D model, then the two merchant offerings behind the two 3D models are either identical, or variants of the same merchant offering, which means that the first and second 3D models are relevant to each other.

In some embodiments, the first and second stored 3D models may be associated with different merchant offerings, where the first stored 3D model may be determined to be relevant to the second stored 3D model on the basis of the different merchant offerings belonging to a same category. For example, each stored listing of the different merchant offerings may be stored in a respective data entry in a product database 310, where each data entry may have a product field containing a respective field value representing a product category for the merchant offering. If the value in the category field for the merchant offering for the first 3D model is the same as the value in the category field for the merchant offering for the second 3D model, then the merchant offerings are determined to be in the same category, and the first and second 3D models are determined to be relevant to each other. For instance, the first 3D model may be of a dining table and the second 3D model may be of a coffee table.

In some embodiments, the first and second stored 3D models may be associated with different merchant offerings (from the same or different merchants), each having a different product type, and may still be considered relevant to each other. For example, a pair of sunglasses of brand A may be relevant to a pair of snow goggles in the same brand A. In this case, the relevancy may be determined based on the two merchant offerings being associated with the same merchant or same online store. In some embodiments, even if the merchant offerings are different products and from different brands, the first and second 3D models may still be determined to be relevant to each other, if the visual appearances of the two merchant offerings behind the two 3D models have a high resemblance to each other. In this case, the relevance may be determined based on a visual appearance resemblance score, which may in turn be calculated based on the 3D models themselves in known ways (e.g., using machine vision techniques). In other words, regardless of the respective merchant offerings, two 3D models may be determined to be relevant to each other if and when they appear to be highly similar from a visual perspective. The e-commerce platform 100 may be configured to run a visual appearance comparison between the two 3D models and calculate a visual appearance resemblance score; if the score is above a certain threshold, then the two 3D models may be determined to be relevant to each other, and a recommendation for a desired 2D view for one of the 3D models may be generated based on the other 3D model, in accordance with the steps described in this disclosure.

The desired 2D view may include one or more optimal values for one or more viewing parameters (for the second 3D model) generated based on the collected values for corresponding viewing parameters associated with the first 3D model. For example, the optimal value(s) for one or more viewing parameters may be determined, similar to that described above at step 1106, based on viewing data for the first 3D model. Those optimal value(s) may then be applied to the second 3D model to determine the desired 2D view for the second 3D model. For example, when the merchant product is a chair, the first 3D model may be associated with a chair that is made of leather, and the second 3D model may be associated with the same chair but is made of linen. Both chairs may be of the same size and structure, so part or all of the selected values for the one or more viewing parameters (e.g., viewpoint and/or zoom level) of the desired 2D view of the first 3D model may be applicable to the second 3D model. For another example, the first 3D model may be associated with a chair made for adults, and the second 3D model may be associated with a chair made for children, while both chairs have the same structure and material, with the only difference being the size. In this case, part of the selected values for the one or more viewing parameters (e.g., color) of the desired 2D view of the first 3D model may be applicable to the second 3D model, while the viewpoint and zoom level may be adjusted based on a size difference between of the two chairs.

In some embodiments, if the first and second 3D models are of different merchant offerings but in the same product category, certain viewing parameters collected based on the data from the first 3D model may be precluded from being used to generate a recommendation for the second 3D model. For example, one or more visual properties such as color and texture may be precluded, since they may be limited to the merchant offering associated with the first 3D model, while other viewing parameters such as size and viewpoint may still be relevant to the merchant offering associated with the second 3D model. Other possibilities may exist.

At step 1210, the e-commerce platform 100 generates a recommendation, similar to the process described above in relation to FIG. 11, for a second electronic device, to include the desired 2D view in a stored listing. The stored listing may be listing associated with the merchant product represented by the second 2D model and/or a listing of the online store associated with the second 2D model.

In some embodiments, similar to step 1108 of FIG. 11, step 1210 may be optional, in which case the 2D image generator 342 can generate the 2D image for the second 3D model based on the desired 2D view without generating a recommendation for the desired 2D view. For example, the e-commerce platform 100 may be configured to automatically generate one or more corresponding 2D images for one or more merchant products based on the desired 2D view, without having to generate a recommendation for a second electronic device (e.g., a merchant electronic device 102). This may be pre-configured by a merchant while he or she sets up the stored listing for the merchant product, or for all stored listings in an online store generally. Once a 2D image corresponding to the desired 2D view is generated, it may be stored in 2D image database 320, and a reference (e.g., a memory address) for the desired 2D view may be stored in a data entry 315 in the product database 310 for the corresponding merchant product. In some embodiments, the e-commerce platform 100 may be configured to automatically upload a generated 2D image for a merchant product in a stored listing of the merchant product either in real-time or via batch processing. This feature may be turned on or off by a system administrator or a merchant in store settings.

In examples where step 1206 is performed, the steps 1208 and 1210 may be performed in response to receiving the second 3D model. For example, a recommendation for the desired 2D view of the second 3D model may be generated when the second 3D model is initially uploaded to the e-commerce platform 100 (e.g., as part of the creation of a new product listing).

In examples where step 1206 is omitted, the steps 1208 and 1210 may be performed for a stored second 3D model (e.g., previously uploaded for an existing product listing). For example, the steps 1208 and 1210 may be performed after receiving a request from a merchant device.

In some aspects, a merchant device 102 may be configured to perform a method for receiving a recommendation for a desired 2D view of a 3D model associated with a merchant offering. The merchant device 102 may, as an optional step, upload a 3D model for a merchant offering into e-commerce platform 100 so that the 3D model can be used in a stored listing of the merchant offering in an online store 138. Alternatively, the merchant device 102 may request the e-commerce platform 100 to provide a 3D model for the merchant offering. Next, which is also an optional step, the merchant device 102 may upload or select a default 2D image for the stored listing of the merchant offering. Alternatively and also optionally, the merchant device 102 may request the e-commerce platform 100 to provide a default 2D image for the merchant offering. The default 2D image may be the dominant image (e.g., the largest image on a product landing page) shown by default among multiple images for the merchant offering. In other embodiments, the default image may be the only image shown for the merchant offering by default. In some cases, the default 2D image may be a 2D image randomly generated based on the 3D model by the e-commerce platform 100 without taking into consideration any customer feedback.

Next, as an optional step, the merchant device 102 may send a request to the e-commerce platform 100 for a recommendation for a desired 2D image from the 3D model associated with the merchant offering. The requested recommendation may include a link to the merchant offering associated with the 3D model, or a link to the 3D model itself. The recommendation request may specify a data source for generating the recommendation, which may include: data associated with the 3D model itself, data associated with other 3D models of the same variant of the same merchant offering, data associated with 3D models of other variants of the same merchant offering, and/or data associated with 3D models of other merchant offerings (from the same or different merchants), of the same or a different product type. If the recommendation request does not specify any data source, a default setting may apply. A default setting may include, for example, only data associated with the 3D model or only data associated with the merchant offering of the 3D model.

Next, the merchant device 102 may receive a recommendation for a desired 2D view of the 3D model of the merchant offering. The recommendation may include one or more optimal values for one or more viewing parameters for the desired 2D view and/or may include a 2D image corresponding to the desired 2D view. The recommendation may further include information indicating that a desired 2D view of a merchant offering was determined based on data collected during a certain period, based on data collected from a particular customer cohort, based on data collected from one or more variants and/or one or more merchant offerings, based on positive customer actions, or combinations thereof. Such information may indicate to a merchant that including the desired 2D view (or the recommended 2D image) in the listing would likely result in more customer views, sales, or other positive outcome.

Lastly, the merchant device 102 may choose to accept or reject the recommendation for the desired 2D view (and/or the recommended 2D image) of the 3D model of the merchant offering. In some cases, the recommendation may include an option to update the stored listing of the merchant offering with the 2D image generated based on the desired 2D view of the 3D model of the merchant product. The merchant device 102 may send a response indicating an acceptance to update the stored listing with the 2D image generated based on the viewing parameters in the recommendation.

In some embodiments, after the e-commerce platform 100 receives the user command from the merchant device 102 to update the stored listing of the merchant offering with the desired 2D view, the e-commerce platform 100 may update the default 2D image of the merchant product associated with the stored listing automatically. In some embodiments, the e-commerce platform 100 may be configured to present a user interface through a web browser or an application installed on the merchant device 102 for the merchant to generate, review and update the 2D image of a merchant offering based on the recommendation.

After the stored listing for the merchant product has been updated with the 2D image generated based on the desired 2D view, the e-commerce platform 100 may cause the first electronic device 150 to display the updated 2D image as a default 2D image when a customer browses the stored listing using the electronic device 150, as described above.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

All referenced documents are hereby incorporated by reference in their entireties.

The invention claimed is:

1. A method comprising:
receiving, from a first electronic device, data representing a first selected value for a viewing parameter of a first stored three-dimensional (3D) model;
identifying a user group associated with the received data;
storing the received data in a group of data associated with the user group, the group of data representing multiple stored selected values and associated dwell times for the viewing parameter collected over multiple viewings of the first stored 3D model by other members of the user group;
determining, from the group of data, desired settings specific to the user group for rendering a desired two-dimensional (2D) view, the desired settings for rendering the desired 2D view being determined based on a combination of the stored selected values for the viewing parameter, wherein the stored selected values are combined according to the associated dwell times; and
generating, from the first stored 3D model or from a different second stored 3D model that is relevant to the first stored 3D model, a 2D image corresponding to the desired 2D view by using the determined desired settings to render the 2D image from the first stored 3D model or the different second stored 3D model; and
storing the generated 2D image in an image database at a unique address.

2. The method of claim 1, wherein the data representing the first selected value for the viewing parameter is stored in the group of data based on a first dwell time associated with the first selected value being at least a threshold dwell time.

3. The method of claim 1, wherein the user group is identified based on at least one user attribute extracted from a profile associated with the first electronic device.

4. The method of claim 1, wherein the multiple stored selected values for the viewing parameter includes at least one of:
multiple selected zoom levels;
multiple selected sizes of a virtual object generated based on the first stored 3D model;
multiple selected viewing angles;

multiple selected orientations of the virtual object; or
multiple selected visual properties of the virtual object.

5. The method of claim 1, further comprising:
prior to receiving the data representing the first selected value from the first electronic device, receiving, from each of a plurality of other customer electronic devices, data representing a respective one of the multiple stored selected values for the viewing parameter and a respective dwell time associated with the respective one of the multiple stored selected values for the viewing parameter; and
storing the data received from the plurality of other customer electronic devices in the group of data.

6. The method of claim 1, wherein determining the desired settings specific to the user group for rendering the desired 2D view comprises:
computing a desired value for the viewing parameter that is a weighted average of the stored selected values for the viewing parameter, wherein each stored selected value is weighted according to the respective associated dwell time.

7. The method of claim 6, wherein the viewing parameter is a viewing orientation, and wherein generating the 2D image corresponding to the desired 2D view comprises:
orienting the 3D model according to the computed weighted average for the viewing orientation; and
rendering the 2D image from the oriented 3D model.

8. A system comprising:
a processor in communication with a storage, the processor configured to execute instructions to cause the system to:
receive, from a first electronic device, data representing a first selected value for a viewing parameter of a first stored three-dimensional (3D) model;
identify a user group associated with the received data;
store the received data in a group of data associated with the user group, the group of data representing multiple stored selected values and associated dwell times for the viewing parameter collected over multiple viewings of the first stored 3D model by other members of the user group;
determine, from the group of data, desired settings specific to the user group for rendering a desired two-dimensional (2D) view, the desired settings for rendering the desired 2D view being determined based on a combination of the stored selected values for the viewing parameter, wherein the stored selected values are combined according to the associated dwell times; and
generate, from the first stored 3D model or from a different second stored 3D model that is relevant to the first stored 3D model, a 2D image corresponding to the desired 2D view by using the determined desired settings to render the 2D image from the first stored 3D model or the different second stored 3D model; and
store the generated 2D image in an image database at a unique address.

9. The system of claim 8, wherein the data representing the first selected value for the viewing parameter is stored in the group of data based on a first dwell time associated with the first selected value being at least a threshold dwell time.

10. The system of claim 8, wherein the user group is identified based on at least one user attribute extracted from a profile associated with the first electronic device.

11. The system of claim 8, wherein the multiple stored selected values for the viewing parameter includes at least one of:

multiple selected zoom levels;

multiple selected sizes of a virtual object generated based on the first stored 3D model;

multiple selected viewing angles;

multiple selected orientations of the virtual object; or multiple selected visual properties of the virtual object.

12. The system of claim 8, wherein the processor is further configured to execute instructions to cause the system to:

prior to receiving the data representing the first selected value from the first electronic device, receive, from each of a plurality of other customer electronic devices, data representing a respective one of the multiple stored selected values for the viewing parameter and a respective dwell time associated with the respective one of the multiple stored selected values for the viewing parameter; and store the data received from the plurality of other customer electronic devices in the group of data.

13. A non-transitory computer-readable medium comprising instructions stored thereon, the instructions being executable by a processor of a system to cause the system to:

receive, from a first electronic device, data representing a first selected value for a viewing parameter of a first stored three-dimensional (3D) model;

identify a user group associated with the received data;

store the received data in a group of data associated with the user group, the group of data representing multiple stored selected values and associated dwell times for the viewing parameter collected over multiple viewings of the first stored 3D model by other members of the user group;

determine, from the group of data, desired settings specific to the user group cohort for rendering a desired two-dimensional (2D) view, the desired settings for rendering the desired 2D view being determined based on a combination of the stored selected values for the viewing parameter, wherein the stored selected values are combined according to the associated dwell times; and generate, from the first stored 3D model or from a different second stored 3D model that is relevant to the first stored 3D model, a 2D image corresponding to the desired 2D view by using the determined desired settings to render the 2D image from the first stored 3D model or the different second stored 3D model; and store the generated 2D image in an image database at a unique address.

14. The non-transitory computer-readable medium of claim 13, wherein the data representing the first selected value for the viewing parameter is stored in the group of data based on a first dwell time associated with the first selected value being at least a threshold dwell time.

15. The non-transitory computer-readable medium of claim 13, wherein the user group is identified based on at least one user attribute extracted from a profile associated with the first electronic device.

16. The non-transitory computer-readable medium of claim 13, wherein the multiple stored selected values for the viewing parameter includes at least one of:

multiple selected zoom levels;

multiple selected sizes of a virtual object generated based on the first stored 3D model;

multiple selected viewing angles;

multiple selected orientations of the virtual object; or multiple selected visual properties of the virtual object.

17. The non-transitory computer-readable medium of claim 13, wherein the instructions are further executable by the processor of the system to cause the system to:

prior to receiving the data representing the first selected value from the first electronic device, receive, from each of a plurality of other customer electronic devices, data representing a respective one of the multiple stored selected values for the viewing parameter and a respective dwell time associated with the respective one of the multiple stored selected values for the viewing parameter; and store the data received from the plurality of other customer electronic devices in the group of data.

\* \* \* \* \*